(12) United States Patent
Salo

(10) Patent No.: US 9,338,253 B2
(45) Date of Patent: May 10, 2016

(54) APPARATUS AND METHOD FOR PROVIDING SEMANTICALLY AWARE NETWORK SERVICES

(71) Applicant: Timothy J. Salo, Saint Paul, MN (US)

(72) Inventor: Timothy J. Salo, Saint Paul, MN (US)

(*) Notice: Subject to any disclaimer, the term of this patent is extended or adjusted under 35 U.S.C. 154(b) by 226 days.

(21) Appl. No.: 14/294,144

(22) Filed: Jun. 3, 2014

(65) Prior Publication Data

US 2014/0331042 A1 Nov. 6, 2014

Related U.S. Application Data

(62) Division of application No. 11/871,157, filed on Oct. 12, 2007, now Pat. No. 8,745,185.

(60) Provisional application No. 60/829,295, filed on Oct. 12, 2006.

(51) Int. Cl.

| | | |
|---|---|---|
| *G06F 15/173* | (2006.01) | |
| *H04L 29/08* | (2006.01) | |
| *H04L 12/725* | (2013.01) | |
| *H04L 12/851* | (2013.01) | |
| *H04L 12/823* | (2013.01) | |
| *H04L 29/06* | (2006.01) | |

(52) U.S. Cl.
CPC ............ *H04L 67/327* (2013.01); *H04L 45/306* (2013.01); *H04L 45/308* (2013.01); *H04L 47/24* (2013.01); *H04L 47/32* (2013.01); *H04L 67/2804* (2013.01); *H04L 67/32* (2013.01); *H04L 69/22* (2013.01); *H04L 69/321* (2013.01); *H04L 63/0428* (2013.01)

(58) Field of Classification Search
CPC .................................................... H04L 67/327
USPC ........................................ 709/223, 225, 238
See application file for complete search history.

(56) References Cited

U.S. PATENT DOCUMENTS

| | | | |
|---|---|---|---|
| 6,044,080 | A | 3/2000 | Antonov |
| 6,046,980 | A | 4/2000 | Packer |
| 6,285,679 | B1 | 9/2001 | Dally et al. |

(Continued)

OTHER PUBLICATIONS

Ahn, Gahng-Seop, et al., "Swan—Service Differentiation in Stateless Wireless Ad Hoc Networks", "Proc. IEEE INFOCOM", Jun. 2002, Publisher: http://comet.columbia.edu/swan/swan-infocom.pdf.

(Continued)

*Primary Examiner* — Jason Recek
(74) *Attorney, Agent, or Firm* — Charles A. Lemaire; Lemaire Patent Law Firm, P.L.L.C.

(57) ABSTRACT

A method and apparatus where network-layer devices use host-provided, detailed, per-packet, semantic information (DPPS information), which describes the content, meaning, importance, and/or other attributes of particular application data and is associated with each packet, to provide enhanced network services. In some embodiments of the above method, network-layer devices use DPPS information that includes QoS-related information to provide fine-grained, content-aware, and/or complex QoS assurances or similar services. In some embodiments, network-layer devices use DPPS information to provide network-based, application-protocol-independent, rate-adaptation services. In some embodiments, network-layer devices use DPPS information to provide highly efficient, application-protocol-independent, publish/subscribe dissemination services.

20 Claims, 6 Drawing Sheets

(56) References Cited

U.S. PATENT DOCUMENTS

| | | |
|---|---|---|
| 6,452,933 B1 | 9/2002 | Duffield et al. |
| 6,975,638 B1 | 12/2005 | Chen et al. |
| 7,187,679 B2 | 3/2007 | Dally et al. |
| 7,274,700 B2 | 9/2007 | Jin et al. |
| 7,289,453 B2 | 10/2007 | Riedel et al. |
| 7,385,921 B2 | 6/2008 | Itakura et al. |
| 7,489,635 B2 | 2/2009 | Evans et al. |
| 7,656,879 B2 | 2/2010 | Riedel et al. |
| 8,477,627 B2 | 7/2013 | Bosloy et al. |
| 2006/0221837 A1 | 10/2006 | Gardner et al. |

OTHER PUBLICATIONS

Cerf, Vint, "The Catenet Model for Internetworking", Jul. 1978, vol. IEN 48, Publisher: http://www.isi.edu/in-notes/ien/ien48.txt.

Lee, Seoung-Bum, et al., "Insignia—In-Band Signaling Support for QoS in Mobile Ad Hoc Networks", "http://www.comet.columbia.edu/insignia/insignia98.pdf", Oct. 12-14, 1998, Publisher: Proceedings of 5th Intl. Workshop on Mobile Multimedia Communication MoMuc 98.

Object Management Group, "Data Distribution Service for Real-Time Systems Specification", "Object Management Group", Dec. 2005, Jan. 2007, Publisher: http://www.omg.org/docs/formal/07-01-01.pdf.

Braden, R., et al., "Integrated Services in the Internet Architecture: an Overview", "ftp://ftp.isi.edu/in-notes/rfc1633.txt", Jun. 1994, vol. RFC 1633, Publisher: Network Working Group.

Baker, F., et al., "Requirements for IP Version 4 Routers", "http://www.faqs.org/rfcs/rfc1812.html", Jun. 1995, vol. RFC 1812, Publisher: Network Working Group.

Deering, S., et al., "Internet Protocol, Version 6 (IPv6)", "http://www.ietf.org/rfc/rfc2460.txt", Dec. 1998, vol. RFC 2460, Publisher: Network Working Group.

Blake, et al., "An Architecture for Differentiated Services", "http://www.ietf.org/rfc/rfc2475.txt", Dec. 1998, vol. RFC 2475, Publisher: The Internet Society.

Fielding, R., et al., "Hypertext Transfer Protocol—HTTP/1.1", "http://www.w3.org/Protocols/rfc2616/rfc2616.html", Jun. 1999, vol. RFC 2616, Publisher: The Internet Society.

Kent, et al., "Security Architecture for IP", "http://www.ietf.org/rfc/rfc4301.txt", Dec. 2005, vol. RFC 4301, Publisher: Standards Track.

Kent, "IP Encapsulating Security Payload (ESP)", "http://www.rfc-editor.org/rfc/rfc4303.txt", Dec. 2005, vol. RFC 4303, Publisher: The Internet Society.

Information Sciences Institute, University of Southern California, "Internet Protocol", "DARPA Internet Program", Sep. 1981, vol. RFC 791, Publisher: http://www.faqs.org/rfcs/rfc791.html.

Information Sciences Institute, University of Southern California, "Transmission Control Protocol", "DARPA Internet Program", Sep. 1981, vol. RFC 793, Publisher: http://www.faqs.org/rfcs/rfc793.html.

APPARATUS AND METHOD FOR PROVIDING SEMANTICALLY AWARE NETWORK SERVICES

CROSS-REFERENCE TO RELATED APPLICATIONS

This application is a divisional of, and claims benefit of, U.S. patent application Ser. No. 11/871,157 filed on Oct. 12, 2007, titled "Method and apparatus for providing semantically aware network services" (which issued as U.S. Pat. No. 8,745,185 on Jun. 3, 2014), which claims benefit of U.S. Provisional Patent Application 60/829,295 entitled "Extensible framework and method for fine-grained, content-aware, quality-of-service (QoS) assurances," filed Oct. 12, 2006, both of which are incorporated herein by reference in their entirety.

STATEMENT REGARDING FEDERALLY SPONSORED RESEARCH OR DEVELOPMENT

This invention was made with Government support under Contract FA8750-05-C-0151 awarded by the Air Force. The Government has certain rights in this invention.

FIELD OF THE INVENTION

The present invention pertains generally to the field of computer networks. More particularly, this invention pertains to an improved method, apparatus and data structures for providing quality-of-service (QoS) assurances and similar enhanced services in packet-switched computer networks.

BACKGROUND OF THE INVENTION

FIG. 1 is a highly simplified view of a conventional packet-switched computer network ("computer network"). The computer network includes "routers", which are intelligent devices that control the flow of information through the network. The routers are interconnected by transmission facilities ("links"), such as electrical cables, fiber-optic cables, or wireless-transmission facilities. The computer network enables "hosts", which are typically the source or destination of information transported by the network, to exchange information with each other. To exchange information with another host, an origination host places the information to be transported ("application data," which is typically data from the application-layer software of the system) into a "packet" (a specially formatted sequence of bits typically handled by the network-layer software and/or hardware), and transmits the packet to a router in the network. This packet is "forwarded" from one router to another until the final router transmits the packet to the destination host (See "The Catenet Model for Internetworking" by Vint Cerf, *Internet Engineering Note* 48 (*IEN*48), July 1978, Defense Advanced Research Projects Agency, Information Processing Techniques Office; available at www.isi.edu/in-notes/ien/ien48.txt, which is incorporated herein by reference).

FIG. 2 illustrates the structure of a typical packet that includes a "packet header" and "packet data". The packet header contains control information that influences how the packet is processed, while the packet data is the information that the packet is transporting. The packet header may include several sequences of contiguous bits ("fields"), such as a field that identifies the origination host or a field that identifies the destination host. In some protocols, the packet header includes two components: a fixed-length header, which is always present, and a variable-length header, which is optional.

The processing of packets by hosts and routers is controlled by network protocols ("protocols"), which specify the format of packets and the procedures for exchanging packets. The protocols used in the Internet are often referred to as "the Internet protocol suite". The Internet protocol suite employs the concept of "protocol layering", where the packet-data portion of a packet may contain a complete packet of another, generally "higher layer" protocol.

FIG. 3 illustrates the protocol layering that is used by the Internet protocol suite. A "link protocol" controls the transfer of packets between adjacent network nodes (e.g., hosts or routers); a wide variety of link protocols are used with the Internet protocol suite. A "network protocol" controls the transfer of packets between the origination network node and the destination network node; only one network protocol is included in the Internet protocol suite, namely the Internet Protocol (IP). A "transport protocol" ensures that information is transferred reliably between the origination and destination network nodes; many transport protocols are included in the Internet protocol suite, such as the Transmission Control Protocol (TCP) (which is specified by Postel, Jon, Ed., "Transmission Control Protocol", RFC 793, September 1981, University of Southern California, Information Sciences Institute; which is incorporated herein by reference). An application protocol is, from the perspective of the Internet protocol suite, the ultimate originator or consumer of data; numerous application protocols are included in the Internet protocol suite, such as the Hypertext Transfer Protocol (HTTP) (which is specified by Fielding, Roy T., et. al, "Hypertext Transfer Protocol—HTTP/1.1", *RFC* 2616, June 1999, Internet Engineering Task Force; which is incorporated herein by reference), which controls the transfer of information between a Web server and a Web browser.

Two major versions of the Internet Protocol have been specified, IP Version 4 ("IPv4") (specified by Postel, Jon, Ed., "Internet Protocol", *RFC* 791, September 1981, University of Southern California, Information Sciences Institute; which is incorporated herein by reference), which is widely deployed, and IP Version 6 ("IPv6") (specified by Deering, Stephen and Robert Hinden, "Internet Protocol, Version 6 (IPv6) Specification", RFC 2460, December 1998, Internet Engineering Task Force; which is incorporated herein by reference), which may become widely deployed in the future. The IPv4 and IPv6 packet headers contain both a fixed-length header and a variable-length header. The IPv4 variable-length header is called the "IP Options", while the IPv6 variable-length header is called the "Extension Headers".

An important security component of the Internet protocol suite is the Internet Security (IPsec) protocols (which are described by Kent, Stephen and Karen Seo, "Security Architecture for the Internet Protocol", *RFC* 4301, December 2005, Internet Engineering Task Force; which is incorporated herein by reference). The Encapsulating Security Protocol (ESP) (which is specified in a document by Kent, Stephen, "IP Encapsulating Security Payload (ESP)", *RFC* 4303, December 2005, Internet Engineering Task Force; which is incorporated herein by reference), one of the IPsec protocols, transports or "encapsulates" an IP packet that is to be protected within another, "encapsulating" IP packet. The encapsulated IP packet may be encrypted, which prevents the disclosure of the contents of the encapsulated IP packet, either its packet header or its packet data, to any system that does not possess the appropriate cryptographic keys.

FIG. 4 is a highly abstracted summary of the major components of a typical router (a summary of the structure and operation of a router can be found in a document by Baker, Fred, Ed., "Requirements for IP Version 4 Routers", *RFC* 1812, June 1995, Internet Engineering Task Force; which is incorporated herein by reference). An "interface" connects the router to a link; a router may have several interfaces and be connected to several links. An interface has associated with it one or more "transmit queues", which hold packets that are waiting to be transmitted on the interface. These transmit queues may have different priorities, such that packets in a higher-priority queue are likely to be transmitted before packets in a lower-priority queue. A router generally contains one or more programmable computers, and as a result contains "router software". The router software performs many functions, include "forward incoming packet". A "router configuration" is information that guides the overall operation of a specific router, is typically created manually, and is generally fairly static. A "route information base" contains information about which router a packet should be forwarded to in order to eventually reach a particular destination, and is often updated dynamically to quickly reflect changes in the network.

Routers process network-layer-protocol packets, such as IP packets in the Internet protocol suite. The forward-incoming-packet software processes a packet received from an interface (an "incoming packet"). The forward-incoming-packet software determines how an incoming packet should processed based on information contained in the packet header of the IP packet, information contained in the router configuration, information contained in the route information base, and possibly other information. This software may determine that an incoming packet should be placed in a particular transmit queue for transmission on a specific interface, that an incoming packet should be discarded ("dropped"), that some other packet should be dropped, or that some other action should be taken. Because the principal function of routers is to process network-layer packets, they are sometimes referred to as "network-layer devices".

As the speed of links has increased dramatically over the last two decades, the time within which the forward-incoming-packet software must process an incoming packet has decreased correspondingly. As a result, router vendors have traditionally strived to simplify the decisions that the forward-incoming-packet software must make. This is particularly true in very high-speed routers that must support link speeds of many gigabits-per-second, where the computational capacity of the router, rather than the bandwidth of the links, is often the scarce resource that needs to be conserved.

A. Quality of Service (QoS) Background

In many environments, it is highly desirable for a network to treat some packets differently than others, based on one or more characteristics of the packets. One important characteristic of a packet is the type of application data that it is transporting. For example, it is often beneficial to ensure that packets carrying voice data (e.g., real-time telephone calls) are moved through the network more quickly than packets that are carrying application data that are less sensitive to delay. When a network provides different levels of services to different packets based on some of their characteristics, the network is said to provide "quality-of-service (QoS) assurances". In order to make the task of providing QoS assurances more tractable, packets are sometimes grouped into "flows", where a flow is all of the packets that are part of a particular connection between an application on one host and another application on another host. Another approach is to categorize packets into different "traffic classes" or "classes of traffic". For example, packets carrying voice data may be considered one class of traffic, while packets carrying file-transfer data may be considered another class of traffic.

Numerous QoS objectives have been previously described, such as ensuring that all of the packets in a particular flow or traffic class receive at least a certain amount of bandwidth, ensuring that certain packets are transported through the network within some specified period of time, or ensuring that the variance in the time that it takes certain packets to be transported through the network is below some specified value. Many other QoS objectives could be and have been described, although most of them have been fairly simple.

Numerous techniques have been developed that enable a router to implement or "enforce" QoS assurances. These techniques include assigning multiple, prioritized transmit queues to each interface; managing the transmit queues (such as deciding which packets to discard when a queue starts to become full); measuring and controlling the amount of bandwidth that is made available to a particular flow or traffic class; as well as numerous other techniques.

The Internet architecture includes two QoS models, or general strategies for providing QoS assurances: the Integrated Services model and the Differentiated Services model.

The Integrated Services model (described by Baden, Robert, David Clark, and Scott Shenker, "Integrated Services in the Internet Architecture: an Overview", *RFC* 1633, June 1994, Internet Engineering Task Force; which is incorporated herein by reference), enables an application to reserve network resources, such as link bandwidth or transmit queue space, for a flow. An application may reserve network resources by sending a request through the network to the application with which it intends to communicate. The routers along the path may reserve for the flow resources, if they are available, in response to the request. All packets within a flow receive the same level of service. The level of service received by the packets within a flow is only indirectly related to the content, meaning, importance, and/or other attributes of the application data transported by the packets. The Integrated Services model has not been widely deployed, in large part because it does not scale well (i.e., it impedes the deployment and operation of very large networks because the routers in the core of a very large network must manage a very large number of reservations). Additionally, the Integrated Services model does not respond well to changes in the route that the packets of a flow take through the network, because after a route changes, the locations of the reserved resources no longer match the routers through with the packets are forwarded.

The Differentiated Services model (summarized by Blake, Steven, et. al, "An Architecture for Differentiated Services", *RFC* 2475, December 1998, Internet Engineering Task Force; which is incorporated herein by reference), classifies all packets into as many as sixty-four different traffic classes and potentially provides a different level of service to each of these traffic classes. A six-bit field in the fixed header of IP packets, called the Differentiated Services Code Point (DSCP), identifies the traffic class to which a packet belongs. All packets within a traffic class receive the same level of service. The level of service received by the packets within a traffic class is manually configured, generally does not change once the network has been configured, and is only indirectly related to the content, meaning, importance, and/or other attributes of the application data transported by the packets. The Differentiated Services model scales well, because even routers in very large networks need to support at most sixty-four different classes of traffic. However, because the differentiated services model can support only a limited number of traffic classes, it can provide only very coarse-grained QoS assurances. The initial version of the IPsec ESP interfered with the use of the Differentiated Services model because the DSCP field in the original, encapsulated packet was inaccessible to routers when encryption was employed. An updated version of the ESP specification permits the encrypting node to copy the DSCP field from the header of the encapsulated IP packet into the DSCP field of the header of the encapsulating IP packet. This permits routers to access the copy of the DSCP field that is in the packet header of the encapsulating packet, without necessarily being able to decrypt the encrypted, encapsulated packet.

B. Ad Hoc Networks Background

Technology advances have enabled the development of mobile, ad hoc, wireless networks ("ad hoc networks"). The behavior of ad hoc networks contrasts sharply with that of traditional, wired networks. In ad hoc networks, network nodes (which generally perform the functions of both hosts and routers), configure themselves into a network without manual intervention, whereas the topologies (the global structure of the links, the routers, and the interconnections between them), of wired networks are generally designed and configured manually. The topologies of ad hoc networks may change repeatedly and rapidly as nodes move or wireless propagation changes, which contrasts with the much more stable topologies of wired networks. The error rates of wireless links are generally many orders of magnitude higher than those for most wired links, and the bandwidth of wireless links may change over time as propagation conditions change, unlike the fixed bandwidth of wired links.

Developing technologies to provide QoS assurances in the highly dynamic environments presented by ad hoc networks has proven to be difficult. Efforts have been made to adapt the Integrated Services model (such as that described by Lee, Seoung-Bum and Andrew T. Campbell, "INSIGNIA: In-Band Signaling Support for QoS in Mobile Ad Hoc Networks", Proc. of $5^{th}$ International Workshop on Mobile Multimedia Communications (MoMuC '98), Berlin Germany, October 1998; which is incorporated herein by reference), and the Differentiated Services model (such as that proposed by Gahng-Seop, Ahn, Andrew T. Campbell, Andras Veres and Li-Hsiang Sun, "SWAN: Service Differentiation in Stateless Wireless Ad Hoc Networks", Proc. IEEE INFOCOM 2002, New York, N.Y., June 2002; which is incorporated herein by reference), for use in ad hoc networks. However, these efforts have not been particularly effective. Topology changes quickly make reservations, such as those used in the Integrated Services model, moot. The limited number of traffic classes supported by the Differentiated Services model often does not provide enough granularity to quickly adapt to rapidly changing network topologies or link bandwidths. Furthermore, any QoS architecture that relies upon a node knowing or predicting the current network topology, current traffic patterns or current link bandwidths beyond its immediate vicinity is not likely to be effective in these potentially highly dynamic environments.

The bandwidths of the wireless links typically used in ad hoc networks are generally substantially lower that those used in wired networks, often tens or hundreds of kilobits-per-second, rather than as much as many gigabits-per-second. As a result, link bandwidth, rather than the computational capacity of the router, is often the scarce resource that needs to be conserved.

Publish/Subscribe Background

The "publish/subscribe" model for information dissemination describes a means by which an originator can disseminate information to multiple receivers that have expressed a desire to receive that information (such as the specification by OBJECT MANAGEMENT GROUP, *Data Distribution Service for Real-Time Systems Specification*, December 2005, Object Management Group, Inc.; which is incorporated herein by reference). In the publish/subscribe model, a node "publishes", or makes available, updated information from time to time. This updated information is transported in "messages". Other nodes "subscribe" to, or request to receive, certain information updates as they are published. An underlying dissemination infrastructure isolates a publisher and its subscribers, and ensures that published information is efficiently transmitted to all subscribed nodes. The publisher is generally not aware of the identity or, or even the number of, active subscribers. The published information is categorized into "topics", and nodes can subscribe to one or more specific topics, for example, stock market quotes. A message related to a specific topic may have several "attributes" associated with it. For example, messages that are part of the "stock market quote" topic may include an attribute that contains the name of the company for which the stock price is quoted. The publish/subscribe model permits a node to subscribe to receive only those messages within a topic whose attributes match some criteria. For example, a node might subscribe to receive only those messages in the "stock market quote" topic for which the "company name" attribute matches some specific value.

Many protocols and architectures have been developed to provide publish/subscribe services. These specifications generally focus on the behavior of applications (application-layer software) and application-layer protocols. In particular, most publish/subscribe specifications are silent on precisely how messages should be disseminated to subscribers and even whether messages should be disseminated efficiently.

A number of prior art works relate to the packet-forwarding part of the present invention: U.S. Pat. No. 6,044,080 to Antonov (filed Nov. 19, 1996, issued Mar. 28, 2000), U.S. Pat. No. 6,046,980 to Packer (filed Nov. 24, 1997, issued Apr. 4, 2001), U.S. Pat. No. 6,285,679 to Dally et al. (filed May 26, 1998, issued Sep. 4, 2001), U.S. Pat. No. 6,452,933 to Duffield et al. (filed Nov. 18, 1997, issued Sep. 17, 2002), U.S. Pat. No. 6,975,638 to Chen et al. (filed Oct. 13, 2000, issued Dec. 13, 2005), U.S. Pat. No. 7,187,679 to Dally et al. (filed Sep. 18, 2002, issued May 6, 2007) and U.S. Pat. No. 7,274,700 to Jin et al. (filed Sep. 26, 2002, issued Sep. 25, 2007), each of which is incorporated herein. However, these works are neither necessary nor sufficient for all embodiments of the present invention to achieve the objectives and advantages of the present invention.

BRIEF SUMMARY OF THE INVENTION

Some embodiments of the invention provide a method by which network-layer devices use enhanced information in each packet about the content, meaning, importance, and/or other attributes of particular application data (i.e., "detailed, per-packet, semantic information" (DPPS information)), to provide enhanced network services. According to the present invention, DPPS information can include quality-of-service (QoS)-related information in order to provide enhanced quality-of-service assurances, and/or other information such as information useful for providing enhanced publish/subscribe services and/or other enhanced services. (Note that some of these enhanced publish/subscribe services can also provide enhanced quality-of-service assurances by reducing unnecessary forwarding of published packets to nodes having no subscribers for those published packets.)

One aspect of the present invention includes a method by which a host can specify the detailed, per-packet, semantic (DPPS) information to be associated with each one of a plurality of packets used to transport portions of a set of data (e.g., a set of application data provided by application-layer software). Another aspect of the present invention is a method of associating DPPS information with each network-layer protocol packet. Another aspect of the present invention is a method by which DPPS information can include structured data or multiple attributes. Another aspect of the present invention is a method by which the functionality of the present invention can easily be extended to provide new types of network services. Another aspect of the present invention is a method by which a network-layer device (e.g., router), can access the DPPS information even when the packet with which it is associated is encrypted and encapsulated, without requiring that the network-layer device be able to decrypt the encrypted, encapsulated packet. Another aspect of the present invention is a method by which the DPPS information can be protected from unauthorized modification or disclosure, without requiring that the network-layer device be able to decrypt the encrypted, encapsulated packet. Another aspect of the present invention is a method by which enhanced, per-packet processing can be employed in portions of a network where it is beneficial, but avoided in portions of the network where the costs outweigh the benefits.

In some embodiments of the above method, network-layer devices use DPPS information to provide fine-grained, content-aware, and/or complex QoS assurances. In some embodiments, network-layer devices use DPPS information to provide network-based, application-protocol-independent, rate-adaptation services. In some embodiments, network-layer devices use DPPS information to provide highly efficient, application-protocol-independent, publish/subscribe dissemination services.

Figure 1:
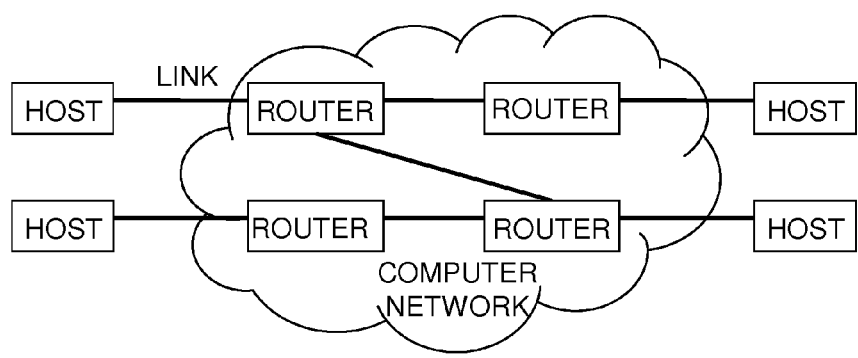
FIG. 1 (PRIOR ART) depicts a packet-switched computer network.
Figure 2:
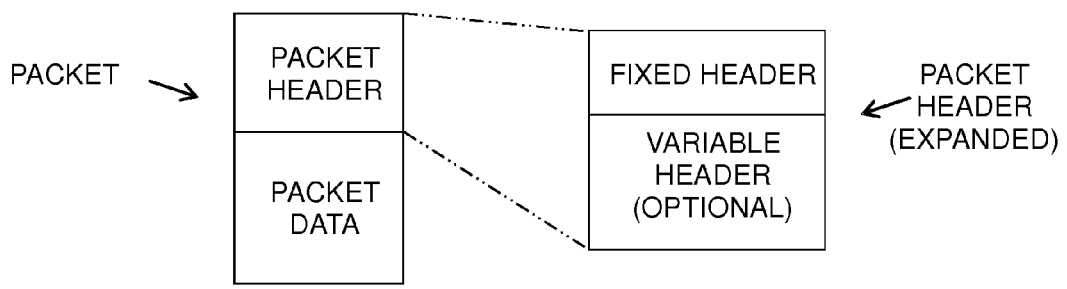
FIG. 2 (PRIOR ART) depicts the structure of a packet.
Figure 3:
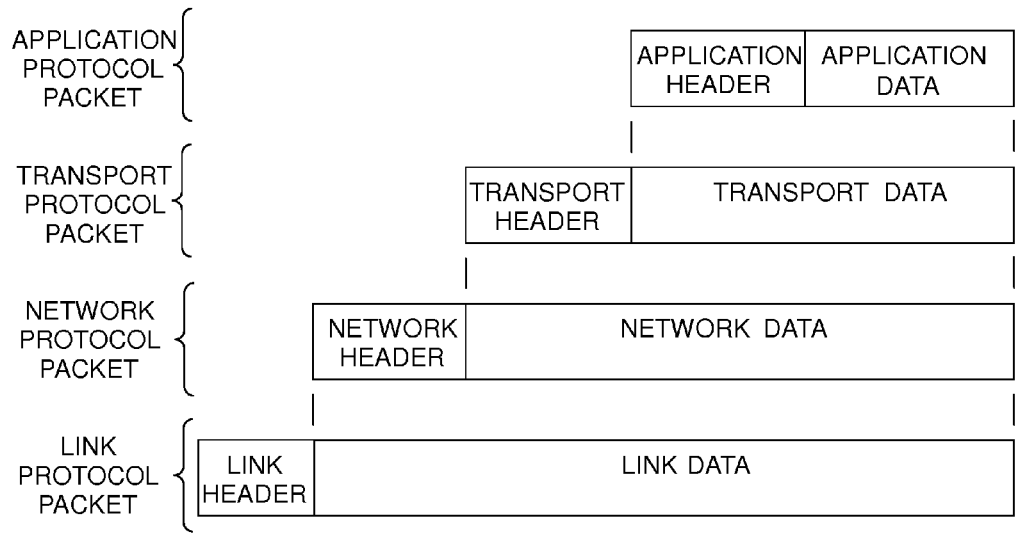
FIG. 3 (PRIOR ART) depicts protocol layering.
Figure 4:
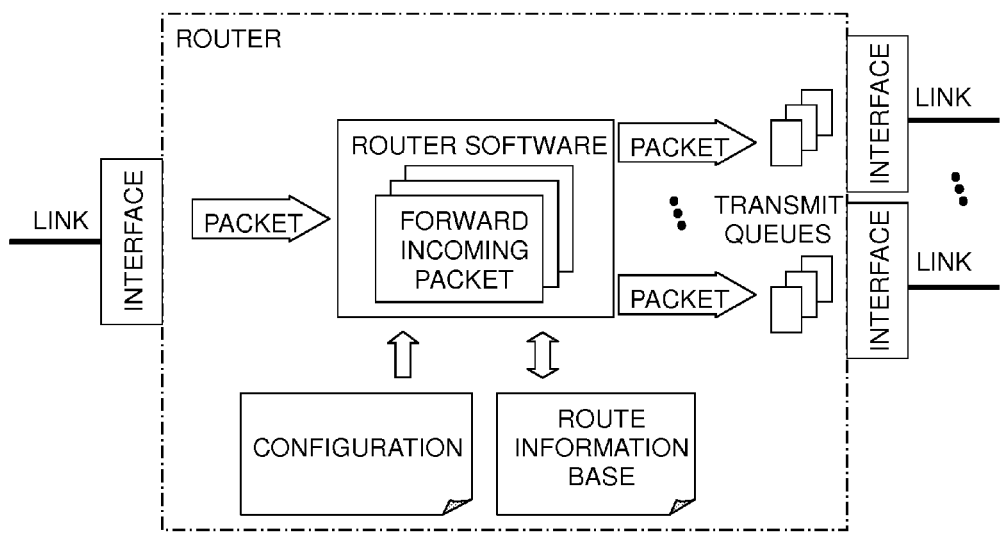
FIG. 4 (PRIOR ART) depicts the high-level structure of a router.
Figure 5:
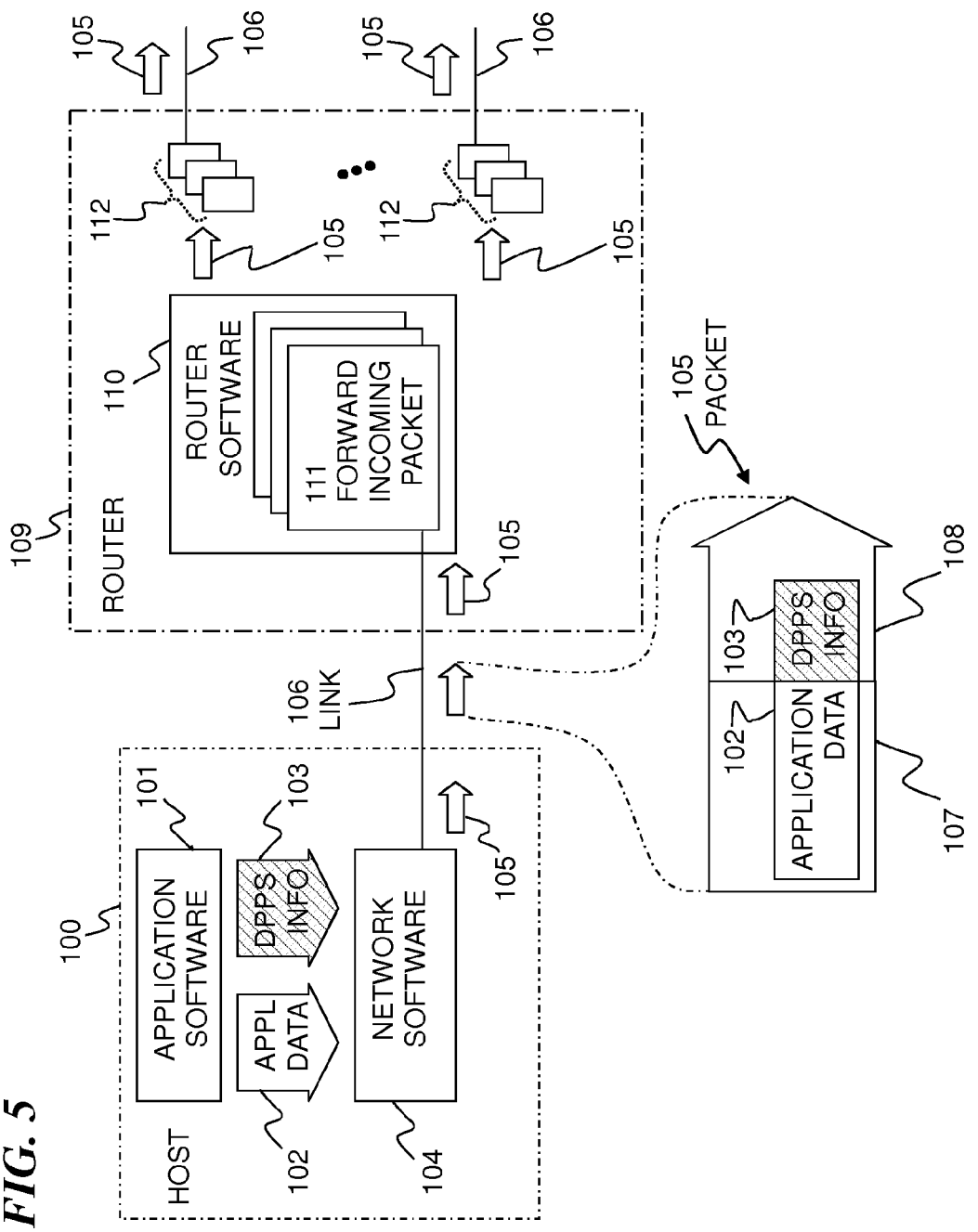
FIG. 5 depicts the Extensible Framework for Fine-Grained, Content-Aware, QoS Assurances.

Table 1 lists the basic components shown in FIG. 5

TABLE 1

| Basic Components shown in FIG. 5 | |
|---|---|
| Component | Description |
| 100 | Host |
| 101 | Application Software |

TABLE 1-continued

| Basic Components shown in FIG. 5 | |
|---|---|
| Component | Description |
| 102 | Application Data |
| 103 | Detailed, Per-Packet, Semantic (DPPS) Information |
| 104 | Network Software |
| 105 | Packet |
| 106 | Link |
| 107 | Packet Data |
| 108 | Packet Header |
| 109 | Router |
| 110 | Router Software |
| 111 | Forward Incoming Packet Processing |
| 112 | Transmit Queues |

Figure 6:
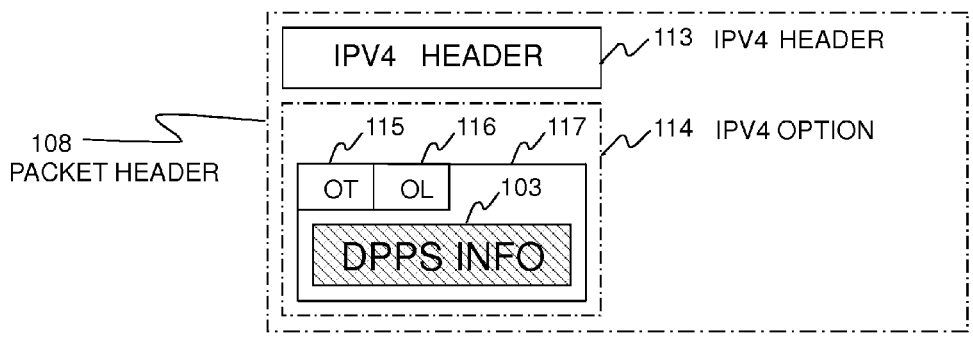
FIG. 6 depicts DPPS information transported in an IPv4 packet header.

Table 2 lists the basic components shown in FIG. 6

TABLE 2

| Basic Components shown in FIG. 6 | | |
|---|---|---|
| Component | Description | |
| 113 | IPv4 Header | |
| 114 | IPv4 Option | |
| 115 | IPv4 Option Type Code Field | ⎫ |
| 116 | IPv4 Option Length Field | ⎬ IP Option |
| 117 | IPv4 Option Data Field | ⎭ |

Figure 7:
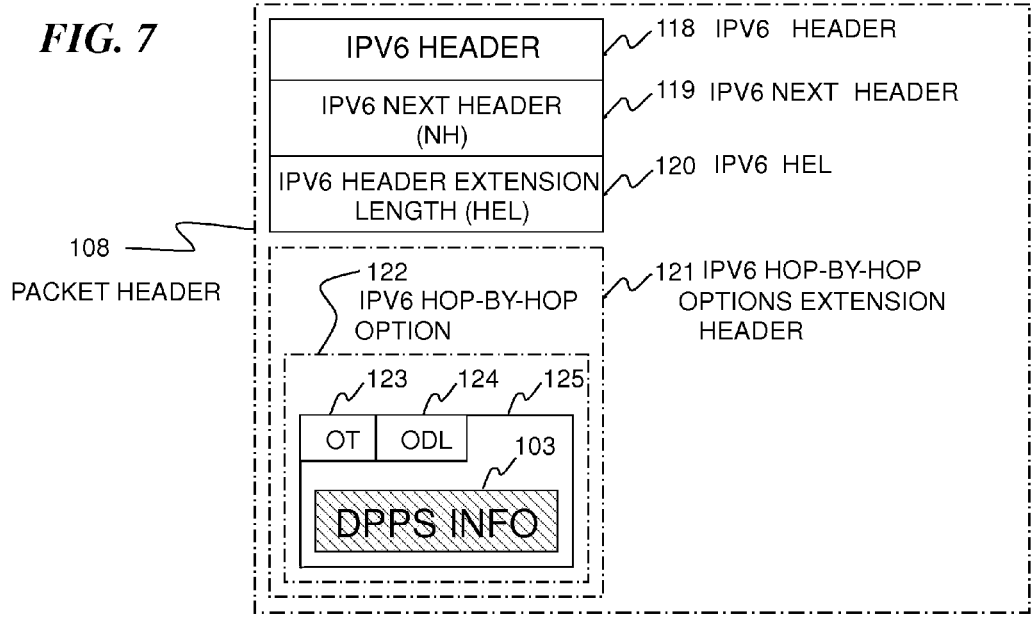
FIG. 7 depicts DPPS information transported in an IPv6 packet header.

Table 3 lists the basic components shown in FIG. 7

TABLE 3

| Basic Components shown in FIG. 7 | | |
|---|---|---|
| Component | Description | |
| 118 | IPv6 Header | |
| 119 | IPv6 Next Header Field | |
| 120 | IPv6 Header Extension Length Field | |
| 121 | IPv6 Hop-by-Hop Options Extension Header | |
| 122 | IPv6 Hop-by-Hop Option | |
| 123 | IPv6 Option Type Code Field | ⎫ |
| 124 | IPv6 Option Data Length Field | ⎬ Extension Header |
| 125 | IPv6 Option Data Field | ⎭ |

Figure 8:
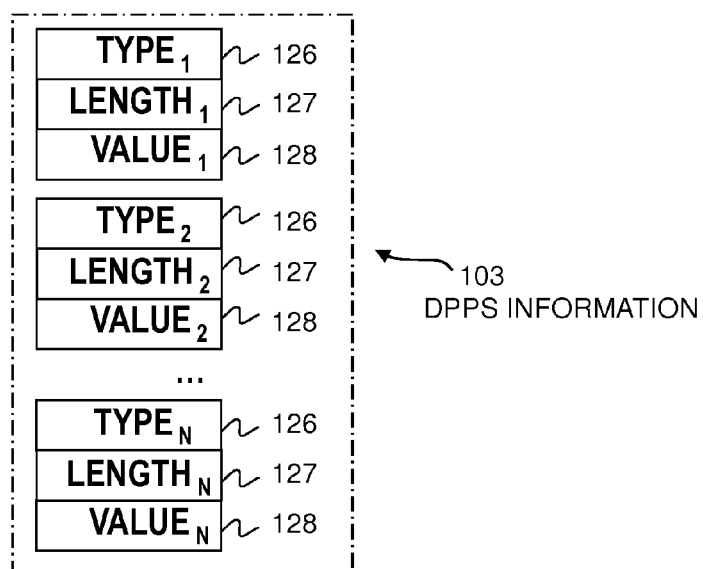
FIG. 8 depicts the internal structure of DPPS information according to some embodiments.

Table 4 lists the basic components shown in FIG. 8

TABLE 4

| Basic Components shown in FIG. 8 | |
|---|---|
| Component | Description |
| 126 | 126 - DPPS Information Type Code Field |
| 127 | 127 - DPPS Information Length Field |
| 128 | 128 - DPPS Information Value Field |

Figure 9:
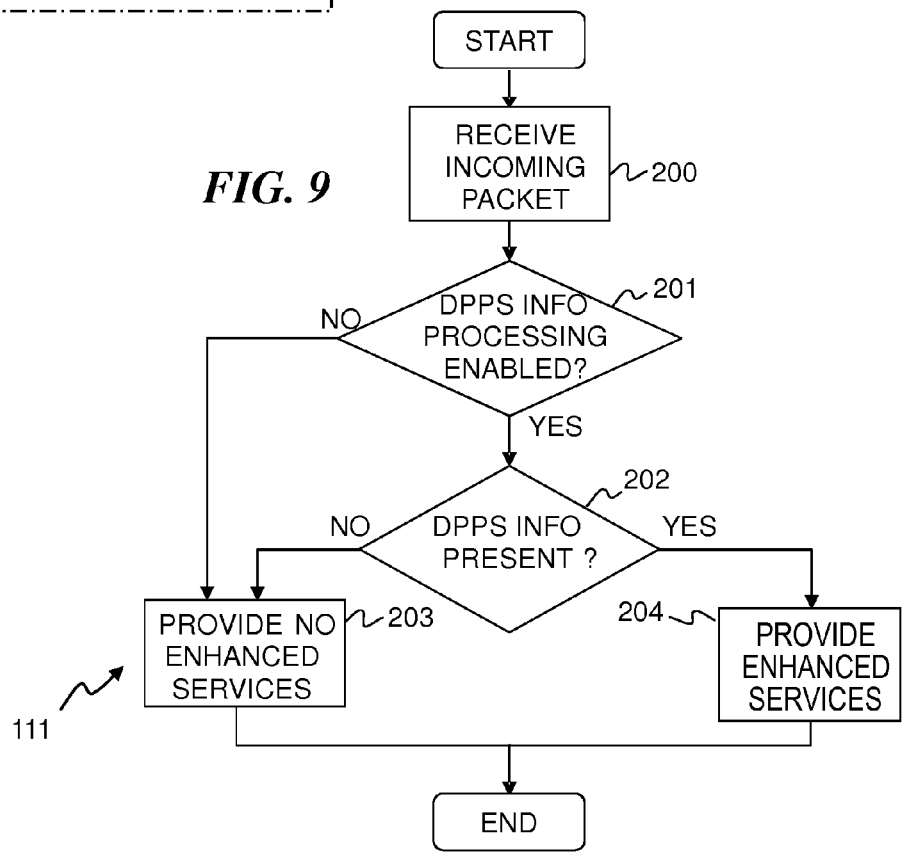
FIG. 9 depicts network-layer-device processing of DPPS information.

Table 5 lists the basic components shown in FIG. 9

TABLE 5

| Basic Components shown in FIG. 9 | |
|---|---|
| Component | Description |
| 200 | Receive Incoming Packet Processing |
| 201 | DPPS Information Processing Administratively Enabled Decision |
| 202 | DPPS Information Present Decision |
| 203 | Provide No Enhanced Services Processing |
| 204 | Provide Enhanced Services Processing |

Figure 10:
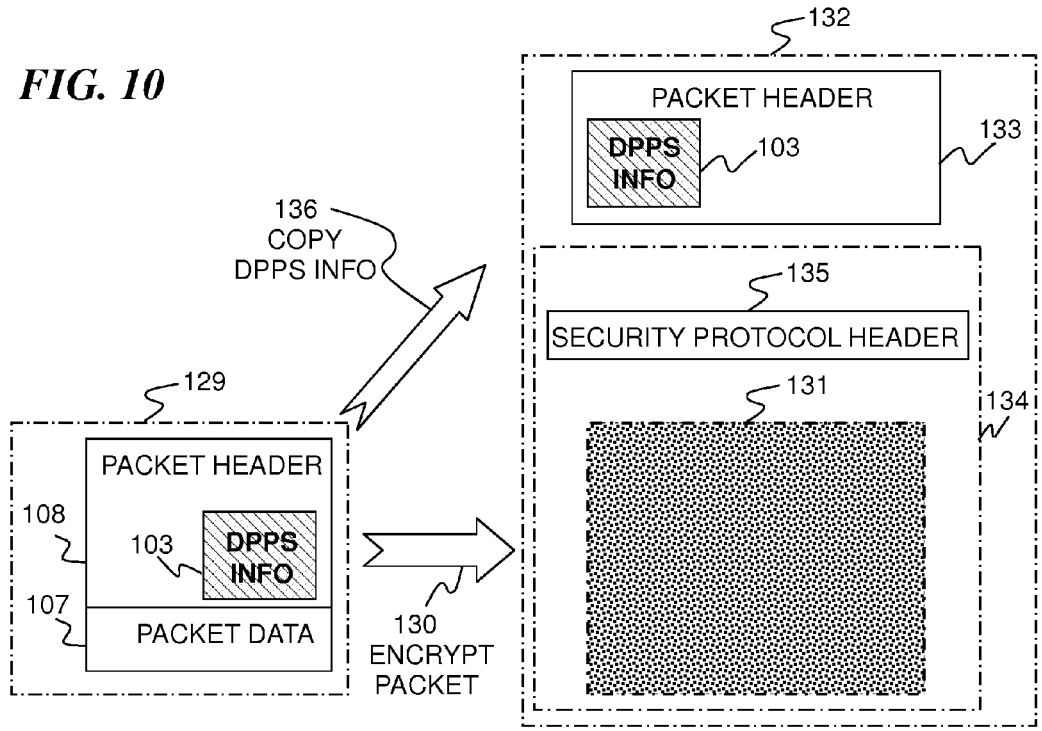
FIG. 10 depicts operation with an encrypting, encapsulating security protocol.

Table 6 lists the basic components shown in FIG. 10

TABLE 6

Basic Components shown in FIG. 10

| Component | Description |
| --- | --- |
| 129 | Packet to be Protected (Plaintext) |
| 130 | Encrypt Packet Process |
| 131 | Encrypted Copy of Protected Packet |
| 132 | Encapsulating Packet |
| 133 | Packet Header of Encapsulating Packet |
| 134 | Packet Data of Encapsulating Packet |
| 135 | Security Protocol Header |
| 136 | Copy DPPS Information Process |

Figure 11:
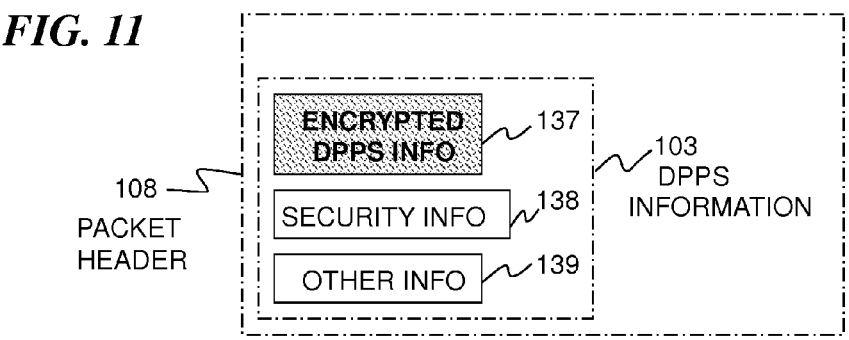
FIG. 11 depicts a packet with encrypted DPPS information.

Table 7 lists the basic components shown in FIG. 11

TABLE 7

Basic Components shown in FIG. 11

| Component | Description |
| --- | --- |
| 137 | Encrypted DPPS Information |
| 138 | Security Information Associated with Encrypted DPPS Information |
| 139 | Other Information Associated with Encrypted DPPS Information |

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The invention described in this application is useful in providing enhanced network services, particularly those that are applicable to, or are adapted to, the unique requirements of demanding network environments, such as mobile, wireless, ad hoc networks. These network environments include resource-constrained, and particularly bandwidth-constrained, networks, in which it is important to conserve bandwidth, often even at the expense of imposing greater processing demands on network-layer devices. Likewise, these network environments include those that are highly dynamic, in which it is often useful to decentralize certain network-layer decision-making in order to ensure that decisions better reflect the current state of the network. Finally, these network environments include those in which it is beneficial for network-layer devices to provide services that can be performed more efficiently at the network layer than at a higher protocol layer, or to provide services at the network layer that can reduce the proliferation of numerous variations of similar services that might be provided at a higher (and perhaps less-efficient) protocol layer.

"Semantic information" as used herein includes information that describes the content, meaning, importance and/or other attributes of application-layer data. In the prior art, network layer devices such as routers are unable to understand the meaning, or semantics, of application-layer data. That is, in conventional networks, application-layer data are opaque to network-layer devices. The present invention enables an application to communicate to network-layer devices (or "signal" network-layer devices) information about the semantics (or meaning) of particular application-layer data. In some embodiments, this semantic information identifies the priority or importance of particular application-layer data. In some embodiments, this semantic information indicates that particular application-layer data are of the highest priority, or have a higher priority than any other application-layer data ("flash override"). In some embodiments, this semantic information asserts that the application is authorized to signal the priority of application-layer data or to signal that the priority of application-layer data is "flash override". In some embodiments, this semantic information indicates the level of particular application-layer data when the application-layer data are hierarchically encoded (e.g., that particular application-layer data are part of the lowest-resolution portion of a visual image). In some embodiments, this semantic information specifies a geographic location that is associated with particular application-layer data. In some embodiments, this semantic information specifies the attributes of a particular message (i.e., application-layer data used by a publish/subscribe system) that a publish/subscribe system uses to determine which subscribers will receive the message.

In some embodiments, the present invention includes one or more of the following:

(a) a method and apparatus by which detailed information about the content, meaning, importance, and/or other attributes of particular application data ("detailed, per-packet, semantic information" ("DPPS information," which could also be called detailed, per-packet, Quality-of-Service (QoS)-related information ("DPPQ information"))), can be associated with the network-layer protocol packet that transports that application data (in some embodiments, the DPPS information includes detailed, per-packet semantic information that is useful for providing enhanced QoS assurances);

(b) a method and apparatus by which DPPS information includes multiple attributes and/or structured data;

(c) a method and apparatus by which a host can specify the DPPS information that is to be associated with each packet that the host transmits;

(d) a method and apparatus by which network-layer devices use the DPPS information associated with each packet to provide enhanced network services;

(e) a method and apparatus by which network-layer devices use DPPS information to provide fine-grained QoS assurances, particularly those in which a network provides each packet with potentially a different level of service, rather than simply providing a different level of service to large aggregations of packets such as flows or traffic classes, and those that support a much larger number of traffic classes than do existing approaches;

(f) a method and apparatus by which network-layer devices use DPPS information to provide content-aware QoS assurances, particularly those that can reflect the content, meaning, importance, and/or other attributes of the application data contained in a packet to a much greater extent than is possible with existing approaches;

(g) a method and apparatus by which network-layer devices use DPPS information to provide complex QoS assurances, particularly those that are based on information not traditionally used for this purpose, such as the geographic location of a host and/or destination of a packet, and/or those that are based on multiple attributes;

(h) a method and apparatus by which a network-layer device uses DPPS information to provide network-based, application-protocol-independent, rate-adaptation services, which will gracefully reduce the information content of a stream of information (e.g., dropping fine details of a video stream while retaining more granular details) in order to reduce the amount of bandwidth the stream of information consumes, without requiring that the network-layer device implements the application-layer protocol or understand the content or meaning of the application-layer data;

(i) a method and apparatus by which network-layer devices use DPPS information to provide highly-efficient, application-protocol-independent, publish/subscribe dissemination services;

(j) a method and apparatus by which network-layer devices access the DPPS information associated with a packet when the original network-layer packet is encrypted and encapsulated, without requiring that the network-layer device be able to decrypt the encrypted, encapsulated packet;

(k) a method and apparatus by which the DPPS information can be protected against modification by or disclosure to unauthorized systems, without requiring that the network-layer devices be able to decrypt the encrypted, encapsulated packet;

(l) a method and apparatus by which new, enhanced network services that use DPPS information can easily be developed and deployed, without adversely affecting existing, deployed, network-layer devices;

(m) a method and apparatus by which fine-grained, content-aware, complex, QoS assurances and other services that use DPPS information can be developed and deployed, without adversely affecting network scalability; and/or (n) a method and apparatus by which the processing of DPPS information can be performed in networks or portions of networks in which it is beneficial, while this processing can be avoided in networks or portions of networks where it is not beneficial.

In some embodiments, this detailed, per-packet, semantic information (DPPS information) enables application software to signal network-layer devices about the content, meaning, importance, and/or other attributes of the application data transported in the packet with which the DPPS information is associated. In some embodiments, DPPS information is optionally associated with every packet. In some embodiments, network-layer devices (such as routers) that employ the present invention use this DPPS information to provide enhanced network services, while conventional network-layer devices can ignore the DPPS information and thus provide only conventional network services. Thus a network can incrementally add network-layer devices that employ the present invention in a non-disruptive manner, keeping the full conventional functionality for both conventional packets and packets containing DPPS information throughout the network, while providing enhanced services for packets containing DPPS information in the portions of the network that use network-layer devices that employ the present invention.

FIG. 5 summarizes the components and operation of one aspect of this present invention, the Extensible Framework for Fine-Grained, Content-Aware, Quality-of-Service (QoS) Assurances. Application software 101 running on a host 100 will, from time to time, generate information, or application data 102, that is to be transmitted to another network node. In some embodiments, the application software 101 also optionally generates detailed, per-packet, semantic information (DPPS information) 103, that is to be associated with the application data 102. The DPPS information 103 enables the application software 101 to signal routers 109 in the network about the content, meaning, importance, and/or other attributes of the application data 102. Network software 104 on the host 100, which is responsible for managing the host's interactions with a network, constructs one or more packets 105 based, in part, on the application data 102 and the DPPS information 103 provided by the application software 101. In some embodiments, DPPS information 103 is transported in the packet header 108 of network-layer packets 105, where it can easily be accessed by network-layer devices. The application data 102 is placed in the packet data 107 of one or more packets 105 and the network software 104 transmits these packets 105 across a link 106 to another network node, such as a router 109 or a host 100.

In some embodiments, DPPS information 103 is transported in the variable header of the packet header 108 of packets 105, which generally avoids the serious backwards compatibility issues that might be caused by adding a new field to transport DPPS information 103 in the fixed header of a packet header 108.

In some embodiments that operate with the IPv4 protocol, the DPPS information 103 is transported in an IPv4 option 114, a variable-length header, as shown in FIG. 6.

FIG. 6 shows an IPv4 option 114 that includes an IPv4 option type code field (OT) 115, an IPv4 option length field (OL) 116, and an IPv4 option data field 117. The DPPS information 103 is carried in the IPv4 option data field 117 within an IPv4 option 114. In some embodiments, a new IPv4 option type code value is used to indicate that the IPv4 option 114 is transporting DPPS information 103. In some embodiments, the "copied" flag is set in the IPv4 option type code value to ensure that network-layer devices provide the same level of service to all fragments of a packet.

In some embodiments that operate with the IPv6 protocol, the DPPS information 103 is transported in an IPv6 hop-by-hop options extension header 121, a variable header, as illustrated in FIG. 7. When an IPv6 hop-by-hop options extension header 121 is present, the IPv6 packet header 118 is followed by an IPv6 next header field (NH) 119 and an IPv6 header extension length field (HEL) 120. The IPv6 hop-by-hop options extension header 121 includes one or more IPv6 hop-by-hop options 122. An IPv6 hop-by-hop option 122 includes an IPv6 option type code field (OT) 123, an IPv6 option data length field (ODL) 124, and an IPv6 option data field 125. The DPPS information 103 is transported in the IPv6 option data field 125 within an IPv6 hop-by-hop option 122. In some embodiments, a new IPv6 option type code value is used to indicate that the IPv6 hop-by-hop option 122 is transporting DPPS information 103. In some embodiments, the two high-order bits of the IPv6 option type code value are set to zero to indicate that routers that do not implement DPPS processing should skip the IPv6 hop-by-hop option 122 that contains the DPPS information 103 and continue processing the packet. Setting these two bits to zero facilitates the deployment of this present invention into existing networks, inasmuch as it permits routers to be upgraded to support DPPS information processing one at a time, rather than all at once.

In some embodiments, the DPPS information 103 may contain multiple attributes or structured data. In some embodiments, multiple attributes or structured data may be delineated by type/length/value fields, as shown in FIG. 8. In the embodiment illustrated in FIG. 8, a DPPS information attribute type field (Type) 126 identifies the attribute or type of data that is contained in the DPPS information attribute value field (Value) 128, while a DPPS information attribute length field (Length) 127 indicates the length of a DPPS information attribute value field 128. The DPPS information attribute value field 128 contains the value of the attribute. In some embodiments, this type/length/value structure is used recursively (i.e., a DPPS information attribute value field 128 may itself contain one or more triples that each include a DPPS information attribute type field 126, a DPPS information attribute length field 127, and a DPPS information attribute value field 128).

As also shown in FIG. 5, the forward-incoming-packet processing 111 is the portion of the router software 110 that is responsible for processing packets that have just been received by a router 109 from another network node. If no DPPS information 103 is present in an incoming packet 105, or if the processing of DPPS information 103 is not administratively enabled, the forward-incoming-packet processing 111 performs no special processing of the incoming packet 105 and provides no enhanced services. If DPPS information 103 is present in an incoming packet 105 and the processing of DPPS information 103 is administratively enabled, then the forward-incoming-packet processing 111 in some embodiments, provides enhanced services, based in part on the DPPS information 103 contained in an incoming packet 105. In particular, in various embodiments of the present invention, forward-incoming-packet processing 111 makes various uses of DPPS information 103 contained in an incoming packet 105 to provide various enhanced services. A common disposition of an incoming packet 105, whether enhanced services are being provided or not, is to place the packet in a transmit queue 112 for transmission on a particular link 106 to either another router 109 or to the destination host 100. In some embodiments, other portions of the router software 110 may make various uses of DPPS information 103 contained in a packet 105 to provide various enhanced services.

FIG. 9 illustrates how forward-incoming-packet processing 111 is enhanced, in some embodiments, to use DPPS information 103 contained in a packet 105 to provide enhanced services. Upon receiving an incoming packet 200, the forward-incoming-packet processing 111 checks whether the processing of DPPS information is administratively enabled 201 in the router 109. If the processing of DPPS information 103 not administratively enabled, then the forward-incoming-packet processing 111 provides no enhanced services 203. Likewise, the forward-incoming-packet processing 111 checks whether an incoming packet 105 contains DPPS information 103. If an incoming packet 105 does not contain DPPS information 103, then the forward-incoming-packet processing 111 provides no enhanced services 203. If the processing of DPPS information is administratively enabled and DPPS information 103 is present in an incoming packet 105, then the forward-incoming-packet processing 111 may use the DPPS information 103 and other information to provide enhanced services 204.

In some embodiments, the network software 104 verifies that the application software 101 is administratively permitted to associate DPPS information 103 with application data 104. In some embodiments, the network software 104 validates the DPPS information 103 created by the application software 101 to ensure that it is within the appropriate ranges or meets other criteria. In a similar fashion, in some embodiments, the router software 110 verifies that the host 101 is administratively permitted to include DPPS information 103 in the packet header 108 of a packet 105. Likewise, in some embodiments the router software 110 validates the DPPS information 103 included in the packet header 108 to ensure that it is within the appropriate ranges or meets other criteria.

In some embodiments, the router software 110 may signal the application software 101 to inform the application software 101 about the action that router software 101 has taken based on DPPS information 103 created by the application software 101. In some embodiments, the router software 110 may signal the application software 101 that the router software 110 has discarded one or more packets, based in part on the DPPS information 103 provided by the application software 101.

Additional Embodiments

Incremental or Focused Deployment

Some embodiments may permit the capability to process DPPS information 103 and to provide enhanced services to be implemented in some, but not necessarily all, network-layer devices in a network. These embodiments permit the capability to process DPPS information 103 and to provide enhanced services to be deployed incrementally (e.g., network-layer devices in an existing network can be upgraded to implement the present invention one-by-one over time, rather than require that all network-layer devices be all upgraded at approximately the same time).

In a similar manner, some embodiments permit the processing of DPPS information 103 and the provision of enhanced services to be administratively enabled in some, but not necessarily all, network-layer devices in a network. These embodiments permit the capability to process DPPS information 103 and to provide enhanced services to be administratively enabled in the portions of the network in which the enhanced services are beneficial, and to be administratively disabled elsewhere. Thus, in some embodiments, one or more aspects of the present invention are activated in routers of some portions of a network and not activated in routers in other portions of the network. For example, the present invention could be implemented and administratively enabled in the network-layer devices that are in demanding network environments such as mobile, wireless, ad hoc networks, where conserving bandwidth is more important than conserving the computational resources of routers. Conversely, this present invention might not be implemented or might not be administratively enabled in high-speed, wired, backbone networks, where conserving the computational resources of routers is more important than conserving bandwidth.

Additional Embodiments

Operation with Security Protocols

FIG. 10 represents the operation of some embodiments with a typical security protocol. In some embodiments, this present invention is used with security protocols; protocols that protect a packet against modification or disclosure by encrypting the packet to be protected 129 and encapsulating the packet to be protected 129 (the "encapsulated packet"), within another packet 105 (the "encapsulating packet").

In some embodiments, packet to be protected 129 includes DPPS information 103 in its packet header 108 and may contain packet data 107. The device that implements the security protocol encrypts 130 the packet to be protected 129, which yields an encrypted copy of the protected packet 131. The encrypted copy of the protected packet 131 is transported in the packet data portion of an encapsulating packet 134. In some embodiments, the packet data portion of an encapsulating packet 134 also contains other information, such as a security protocol header 135, which contains control information used by the security protocol.

A router 109 is generally unable to decrypt the encrypted copy of the protected packet 131, and is therefore unable to access the DPPS information 103 contained in the encrypted copy of the protected packet 131. As a result, the router 109 is unable to use any information contained in the encrypted copy of the protected packet 131 to provide the enhanced services requested (by associating DPPS information 103 with the packet to be protected 129) by the creator of the packet to be protected 129. In some embodiments, a device that creates an encapsulating packet 132 that contains an encrypted copy of a protected packet 131, copies the DPPS information 103 from the packet header of the packet to be protected 129 into the packet header of the encapsulating packet 133. This permits routers 109 to access the copy of the DPPS information 103 in the packet header of the encapsulating packet 133 and therefore to provide the enhanced services requested by the creator of the packet to be protected 129. Routers 109 need not be aware of the details of the operation of the security protocol, or even which, if any security protocol is being used. Likewise, routers 109 need not be able to decrypt the encrypted copy of the protected packet 131.

Additional Embodiments

Protecting DPPS Information

Because DPPS information 103 contains information about the content, meaning, importance, and/or other attributes of the application data with which it is associated, in some environments it is important that only authorized routers 109 access this information. In some embodiments, the DPPS information 103 is encrypted to protect it against modification or disclosure.

FIG. 11 illustrates how in some embodiments encrypted DPPS information 137 is transported as a field within DPPS information 103. In some embodiments, the DPPS information 103 includes a security information field 138 that may reference the security association related to the encrypted DPPS information 137.

In some embodiments, another field 139 in the DPPS information 103 may contain additional, related information, such as a message digest that binds the encrypted DPPS information 137 to the associated application data 101. Binding the encrypted DPPS information 137 to the associated application data 101 prevents an attacker from associating encrypted DPPS information 137 copied from one packet with unrelated application data 102.

In these embodiments, routers 109 need not be able to decrypt the encrypted copy of the protected packet 131, if it is present.

Additional Embodiments

Enhanced Services: Fine-Grained Differentiated Services

In some embodiments, routers 109 use DPPS information 103 to provide differentiation within the maximum of sixty-four traffic classes supported by the Differentiated Services QoS model. In some embodiments, the bandwidth consumed by all packets within a traffic class is limited to some value. If the packets received by a router 109 exceed the allowable bandwidth, the router software 110 must discard some packets. In some embodiments, the router software 110 uses DPPS information 103 to decide which packets to discard. That is, DPPS information 103 may determine the priority of a packet 108 within a traffic class.

In some embodiments, routers 109 use DPPS information 103 to support a larger number of traffic classes than the sixty-four traffic classes supported by the Differentiated Services QoS model. That is, DPPS information 103 may effectively expand the size of the six-bit DSCP field.

In some embodiments, routers 109 use DPPS information 103 (optionally in conjunction with the Differentiated Services QoS model) to enhance the operation of gateways between high-bandwidth and low-bandwidth networks. In particular, application software 101 specifies a priority in the DPPS information 103, which routers 109 use to determine, with greater granularity than is possible with existing techniques, which packets should be dropped first when bandwidth is limited.

In these embodiments, routers 109 need not implement or otherwise embody any understanding of the application protocol being used. Furthermore, if the packet data contains an encrypted copy of the protected packet 131, the routers 109 need not be able to decrypt it.

In some embodiments, application software uses DPPS information to signal the network about how the network should provide fine-grained differentiated services. Referring to the host 100 in FIG. 5, the application software 101 identifies and segregates the application data 102 based on its importance, priority, and/or other attribute. The application software 101 passes application data 102 with a particular importance, priority and/or other attribute, along with DPPS information 103 that indicates this importance, priority, and/or other attribute of the application data 102, to the network software 104. The network software 104 creates one or more packets 105 that contain this application data 103 in the packet data portion of the packet 107 and the associated DPPS information 103 (provided by the application software 101) in the packet header of the packet 108. That is, the network software 104 effectively "labels" or "tags" each packet 105 with DPPS information 103 (provided by the application software 101) carried in the packet header of the packet 108 that indicates this importance, priority, and/or other attribute of the application data 102 transported by the packet 105. The application software 101 repeats this process for all application data. Application data 102 that has similar importance, priority, and/or other attribute need not be continuous.

In some embodiments, router software uses DPPS information to provide fine-grained differentiated services. Referring to the router 109 in FIG. 5, the forward-incoming-packet processing 111 examines the DSCP field in the packet header 108 of the incoming packet 105. The forward-incoming-packet processing 111 may determine that bandwidth is not available on the link 106 on which the incoming packet 105 would be transmitted for an additional packet with that DSCP value. In this case, the forward-incoming-packet processing 111 uses the DPPS information 103 in the incoming packet 105 and in the packets in the transmit queues 112 when determining which packet to discard. In some embodiments, the forward-incoming-packet processing 111 may determine that space is not available for the incoming packet 105 in the transmit queues 112. The forward-incoming-packet processing 111 uses the DPPS information 103 in the incoming packet 105 and in the packets in the transmit queues 112 when determining which packets to discard. In some embodiments, the forward-incoming-packet processing 111 may determine that other constraints prevent an additional packet 105 from being forwarded. In this case, the forward-informing-packet processing 111 uses the DPPS information 103 in the packets 105 when determining which packet or packets should be discarded. In some embodiments, other software in the router software 110 uses the DPPS information 103 contained in the packet header of a packet 108 when determining how a packet should be processed.

Additional Embodiments

Enhanced Services: "Flash Override" Messages

In some embodiments, this present invention provides a "flash override" service, such that a packet with DPPS information 103 that contains a particular value or parameter receives immediate priority over all other packets. This flash-override service may be used, for example, to disseminate "evacuate immediately" messages to firefighters, "zeroize cryptographic keys" messages to security equipment, or survival-critical messages.

In some embodiments, the DPPS information 103 also contains authentication information that permits each router 109 to verify that the request for flash override service originated from an authorized source.

In these embodiments, routers 109 need not implement and/or otherwise embody any understanding of the application protocol being used. Furthermore, if the packet data contains an encrypted copy of the protected packet 131, the routers 109 need not be able to decrypt it.

In some embodiments, application software uses DPPS information to signal the network that the "flash override" service is required. Referring to the host 100 in FIG. 5, the application software 101 passes application data 102 that requires the "flash override" service, along with DPPS information 103 that indicates that the application data 102 should receive "flash override" service, to the network software 104. The network software 104 creates one or more packets 105 that contain this application data 103 in the packet data portion of the packet 107 and the associated DPPS information 103 (provided by the application software 101) in the packet header of the packet 108. That is, the network software 104 effectively "labels" or "tags" each packet 105 with DPPS information 103 (provided by the application software 101) carried in the packet header of the packet 108 that indicates that the application data 102 is to be provided "flash override" service.

In some embodiments, router software uses DPPS information to provide "flash override" services. Referring to the router 109 in FIG. 5, the forward-incoming-packet processing 111 examines the DPPS information 103 in the packet header 108 of the incoming packet 105. If the DPPS information 103 indicates that "flash override" service should be provided for this packet 105, the forward-incoming-packet processing provides this service. In some embodiments, the forward-incoming-packet inserts the packet 105 at the head of the appropriate transmit queue 112.

Additional Embodiments

Enhanced Services: Intelligent Bandwidth Adaptation

In some embodiments, routers 109 use DPPS information 103 to efficiently and gracefully reduce the bandwidth of individual flows, particularly those that contain audio, video, or image information, by reducing the information content of the flow. In these embodiments, the application software 101 that creates the data encodes the data hierarchically and segregates data at different levels in the hierarchy into different packets 105. The DPPS information 103 identifies the hierarchy level of the application data 102 transported by a packet 105. In some embodiments, when the bandwidth of the complete data stream exceeds the available or permissible bandwidth, routers 109 discard higher-resolution layers of the hierarchically encoded data until the remaining data fit in the available bandwidth. In some embodiments, the application data 102 in at least some of these packets 105 is encrypted, the routers are able to provide this service without being able to decrypt the application data 102. Routers 109 need not embody any understanding of the application-layer protocol or data format nor implement any resource-intensive transcoding functionality. Additionally, routers 109 are able to discard higher-resolution data without waiting for the application software 101 that creates the data stream to reduce the rate at which it transmits data.

In some embodiments, routers 109 use DPPS information 103 to reduce the bandwidth of multicast flows. In these embodiments, application software 101 creates a single, high-resolution, hierarchically encoded data stream. Routers 109 use DPPS information 103 to reduce the bandwidth of the multicast flow that is transmitted on each link 106 to some appropriate rate.

In these embodiments, routers 109 need not implement or otherwise embody any understanding of the application protocol being used. Furthermore, if the packet data contains an encrypted copy of the protected packet 131, the routers 109 need not be able to decrypt it.

Additional Embodiments

Enhanced Services: Location-Based Priority

In some embodiments, routers 109 use geographic-location information carried in the DPPS information 103 to provide location-based QoS assurances. In some embodiments, application software 101 specifies a geographic location in the DPPS information 103 of the packets 105 it generates. In some embodiments, routers 109 compare the geographic location contained in the DPPS information 103 of a packet 105 to the geographic location of the router 109 and give priority to the packet when the comparison meets some predetermined criterion (e.g., when the difference or distance between these two geographic locations is below some value). In these embodiments, routers 109 need not implement or otherwise embody any understanding of the application protocol being used. Furthermore, if the packet data contains an encrypted copy of the protected packet 131, the routers 109 need not be able to decrypt it.

Additional Embodiments

Enhanced Services: Publish/Subscribe Dissemination

In resource-constrained network environments, such as ad hoc networks, it is desirable that no message is ever transmitted on a link if no subscribers could possibly receive that copy of the message, and that at most one copy of a message is ever successfully transmitted on a particular link. This objective requires that the message-dissemination mechanism embody an understanding of the physical topology of the network.

In some embodiments, routers 109 use DPPS information 103 to provide an efficient publish/subscribe dissemination service. Application software 101 includes the message topic and other message attributes in the DPPS information 103 associated with each message. Routers 109 maintain a list for each link 106 of the downstream subscribers, the topics to which they are subscribed, and information about which messages within a topic the downstream subscribers wish to receive. Routers 109 compare the DPPS information 103 of a packet with the information about downstream subscribers and their subscriptions, and forward only those packets for which there is a downstream subscriber. In some embodiments, the application data 102 in at least some of these packets 105 is encrypted, and the routers are able to provide this service without being able to decrypt the application data 102. Routers 109 need not embody any understanding of the application-layer protocol or data contained in the application data 102 of the packets 105 that request this service.

Described above is an improved method of providing QoS assurances and similar services in which a host (100) signals network-layer devices about the content, meaning, importance and/or other attributes of application data (102) by associating detailed, per-packet, semantic information (DPPS information) (103) with each packet (105). Network-layer devices, such as routers (109), may use the DPPS information (103) associated with a packet (105) to provide enhanced services. This method enables a network-layer device to provide:

Fine-grained quality-of-service assurances, including those that support a very large number of traffic classes and those in which each packet potentially receives a unique level of service;

Content-aware quality-of-service assurances and other services, particularly those that reflect the content, meaning, importance and/or other attributes of the application data;

Complex quality-of-service assurances, particularly those that use information not traditionally used for this purpose and those that use multiple attributes;

Network-based, application-protocol-independent, rate-adaptation services, which do not require that the network-layer device implement or embody any understanding of the application-layer protocol being used or the format of the application-layer data; and Highly-efficient, application-protocol-independent publish/subscribe dissemination services.

Some embodiments include a method by which detailed, per-packet, semantic information optionally includes multiple attributes and/or structured data. Likewise, some embodiments include a method that enables network-layer devices to access the detailed, per-packet, semantic information, even when the original packet is encrypted and encapsulated, without requiring that the network-layer device be able to decrypt the encrypted, encapsulated packet. Additionally, some embodiments include a method that protects the detailed, per-packet, semantic information against modification of disclosure. The methods described above can be deployed without disrupting existing networks, can be deployed without adversely affecting the scalability of networks that employ these methods, and can be selectively deployed in the networks and portions of networks in which they are most beneficial.

In some embodiments, the present invention provides a method by which one or more network-layer devices can provide fine-grained, content-aware, potentially complex, quality-of-service (QoS) assurances and other enhanced services. This method includes: (a.) a process by which detailed information about the content, meaning, importance, and/or other attributes of particular application data (detailed, per-packet, semantic information), is associated with (typically, inserted into) the packet that transports that application data; (b.) a process by which a host specifies the detailed, per-packet, semantic information that is to be associated with each packet that the host transmits; and (c.) a process by which a network-layer device uses the detailed, per-packet, semantic information associated with each packet to provide enhanced network services.

In some such embodiments, the network-layer device provides fine-grained quality-of-service assurances, particularly those that support a very large number of traffic classes or in which each packet potentially receives a different level of service.

In some embodiments, the network-layer device provides content-aware QoS assurances, particularly those that can reflect the content, meaning, importance, and/or other attributes of the application data contained in a packet.

In some embodiments, the network-layer device provides complex QoS assurances, particularly those that are based on information not traditionally used for this purpose and those that are based on multiple attributes.

In some embodiments, the network-layer device provides rate-adaptation services.

In some embodiments, the network-layer device provides publish/subscribe dissemination services.

In some embodiments, the detailed, per-packet, semantic information optionally includes multiple attributes or structured data.

In some embodiments, the network-layer device accesses the detailed, per-packet, semantic information associated with a packet when the original packet is encrypted and encapsulated.

In some embodiments, the detailed, per-packet, semantic information is protected against modification by or disclosure to unauthorized systems.

In some embodiments, new network services that use detailed, per-packet, semantic information can easily be developed and deployed, without adversely affecting existing, deployed, network-layer devices.

In some embodiments, services that use the detailed, per-packet, semantic information are developed and incrementally deployed, without adversely affecting network scalability.

In some embodiments, the processing of detailed, per-packet, semantic information is performed in networks or portions of networks in which it is beneficial, while this processing is avoided in networks or portions of networks where it is not beneficial.

In some embodiments, the present invention provides a method that includes: obtaining a first portion of a set of application data; specifying first detailed, per-packet, semantic information (DPPS information) for the first portion of the set of application data; associating the first DPPS information with a first packet that will transport the first portion of the set of application data; transmitting the first packet on the network; and processing the first packet in the network using the first DPPS information associated with the first packet to provide enhanced network services.

In some embodiments of the method, the associating of the first DPPS information with the first packet includes inserting the first DPPS information into a variable-length header of the first packet.

In some embodiments of the method, the obtaining of the first portion of the set of application data includes obtaining the first portion of the set of application data by application-layer software that passes the first portion of the set of application data to network-layer software; the specifying of the first DPPS information includes specifying the first DPPS information by application-layer software that passes the first DPPS information to network-layer software; and the associating of the first DPPS information with the first packet includes inserting the first DPPS information into a variable-length header of the first packet and inserting the first set of application data into the first packet.

Some embodiments of the method further include obtaining a second portion of a set of application data; specifying second detailed, per-packet, semantic information (DPPS information) for the second portion of the set of application data; associating the second DPPS information with a second packet that will transport the second portion of the set of application data; transmitting the second packet on the network; and processing the second packet in the network using the second DPPS information associated with the second packet in a manner different than the processing of the first packet.

In some embodiments of the method, the processing of the second packet includes changing a queue order of the first packet within a network-layer device.

In some embodiments of the method, the processing of the second packet includes dropping the first packet within a network-layer device.

In some embodiments of the method, the processing of the second packet includes dropping the second packet within a network-layer device.

In some embodiments of the method, the processing of the second packet includes changing a queue order of the second packet within a network-layer device.

Some embodiments of the method further include obtaining a second portion of a set of application data; associating the first DPPS information with a second packet that will transport the second portion of the set of application data; transmitting the second packet on the network; and processing the second packet in the network using the first DPPS information associated with the second packet to provide enhanced network services.

In some embodiments of the method, the DPPS information includes information about a type of content in the first set of application data.

In some embodiments of the method, the processing of the first packet provides content-aware quality-of-service assurances that reflect the content of the first portion of the set of application data.

In some embodiments of the method, the processing of the first packet provides fine-grained quality-of-service assurances that support a very large number of traffic classes. In some embodiments, the very large number of traffic classes includes at least 256 classes. In some embodiments, the very large number of traffic classes includes at least 512 classes. In some embodiments, the very large number of traffic classes includes at least 1024 classes. In some embodiments, the very large number of traffic classes includes at least 2048 classes. In some embodiments, the very large number of traffic classes includes at least 4096 classes. In some embodiments, the very large number of traffic classes includes at least 8192 classes. In some embodiments, the very large number of traffic classes includes at least 16384 classes. In some embodiments, the very large number of traffic classes includes at least 32768 classes. In some embodiments, the very large number of traffic classes includes at least 65536 classes.

In some embodiments of the method, the processing of packets provides fine-grained quality-of-service assurances in which each of a plurality of packets receives a different level of service.

In some embodiments of the method, the first DPPS information includes QoS-related information and the processing of the first packet provides multi-dimensional QoS assurances based on a plurality of DPPS information attributes.

In some embodiments of the method, the processing of packets provides rate-adaptation services.

In some embodiments of the method, the processing of packets provides publish/subscribe dissemination services.

In some embodiments of the method, the DPPS information includes a plurality of attributes.

In some embodiments of the method, the DPPS information includes structured data.

In some embodiments of the method, the DPPS information includes recursive structured data.

In some embodiments of the method, the processing of the first packet is based on the DPPS information associated with the first set of application data when the first set of application data includes an original packet that is encrypted and encapsulated.

In some embodiments of the method, the DPPS information is protected against modification by and disclosure to unauthorized systems by encryption.

In some embodiments of the method, the processing of packets using DPPS information is performed in network-layer devices that are compatible when connected in a single network with existing, deployed, legacy-type network-layer devices.

In some embodiments of the method, the processing of packets using DPPS information does not adversely affect network scalability.

In some embodiments of the method, processing of packets using DPPS information is enabled in a first portion of a network in which it is beneficial, while this processing is disabled in a second portion of the network where it is not beneficial.

In some embodiments of the method, processing of later-arriving packets into a network-layer device using DPPS information in the later-arriving packets is changed based on the processing of the first DPPS information in the first packet.

In some embodiments of the method, processing of already-arrived packets in a network-layer device is changed based on the processing of the first DPPS information in the first packet.

In some embodiments of the method, the processing of the first packet is performed in a wireless network-layer device in an ad hoc network.

In some embodiments, the present invention provides an apparatus that includes a first computer host system ("the first host") having application-layer software and network-layer software, wherein the application-layer software passes a first portion of a set of application data to the network-layer software and specifies, to the network-layer software, first detailed, per-packet, semantic information (DPPS information) for the first portion of the set of application data, and wherein the network-layer software associates the first DPPS information with a first packet that will transport the first portion of the set of application data; and a network-layer device operatively coupled to the first host, and operable to process the first packet using the first DPPS information associated with the first packet to provide enhanced network services.

In some embodiments of the apparatus, the first host's network-layer software associates the first DPPS information with the first packet includes inserting the first DPPS information into a variable-length header of the first packet.

In some embodiments of the apparatus, the first host's network-layer software inserts the first DPPS information into a variable-length header of the first packet and inserts the first set of application data into the first packet.

In some embodiments, the application-layer software passes a second portion of the set of application data to the network-layer software and specifies, to the network-layer software, second detailed, per-packet, semantic information (DPPS information) for the second portion of the set of application data, and the network-layer software associates the second DPPS information with a second packet that will transport the second portion of the set of application data; and the network-layer device is operable to process the second packet using the second DPPS information associated with the second packet differently than it processed the first packet.

In some embodiments of the apparatus, the network-layer device's processing of the second packet includes changing a queue order of the first packet within a network-layer device.

In some embodiments of the apparatus, the network-layer device's processing of the second packet includes dropping the first packet within a network-layer device.

In some embodiments of the apparatus, the network-layer device's processing of the second packet includes dropping the second packet within a network-layer device.

In some embodiments of the apparatus, the network-layer device's processing of the second packet includes changing a queue order of the second packet within a network-layer device.

In some embodiments of the apparatus, the application-layer software passes a second portion of the set of application data to the network-layer software, and the network-layer software associates the first DPPS information with a second packet that will transport the second portion of the set of application data; and the network-layer device is operable to process the second packet using the first DPPS information associated with the second packet differently than it processed the first packet.

In some embodiments of the apparatus, the DPPS information includes information about a type of content in the first set of application data.

In some embodiments of the apparatus, the network-layer device's processing of the first packet provides content-aware quality-of-service assurances that reflect the content of the first portion of the set of application data.

In some embodiments of the apparatus, the network-layer device's processing of the first packet provides fine-grained quality-of-service assurances that support a very large number of traffic classes. In some embodiments, the very large number of traffic classes includes at least 256 classes. In some embodiments, the very large number of traffic classes includes at least 512 classes. In some embodiments, the very large number of traffic classes includes at least 1024 classes. In some embodiments, the very large number of traffic classes includes at least 2048 classes. In some embodiments, the very large number of traffic classes includes at least 4096 classes. In some embodiments, the very large number of traffic classes includes at least 8192 classes. In some embodiments, the very large number of traffic classes includes at least 16384 classes. In some embodiments, the very large number of traffic classes includes at least 32768 classes. In some embodiments, the very large number of traffic classes includes at least 65536 classes.

In some embodiments of the apparatus, the network-layer device's processing of packets provides fine-grained quality-of-service assurances in which each of a plurality of packets receives a different level of service.

In some embodiments of the apparatus, the first DPPS information includes QoS-related information and the network-layer device's processing of the first packet provides multi-dimensional QoS assurances based on a plurality of DPPS information attributes.

In some embodiments of the apparatus, the network-layer device's processing of packets provides rate-adaptation services.

In some embodiments of the apparatus, the network-layer device's processing of packets provides publish/subscribe dissemination services.

In some embodiments of the apparatus, the DPPS information includes a plurality of attributes.

In some embodiments of the apparatus, the DPPS information includes structured data.

In some embodiments of the apparatus, the DPPS information includes recursive structured data.

In some embodiments of the apparatus, the network-layer device's processing of the first packet is based on the DPPS information associated with the first set of application data when the first set of application data includes an original packet that is encrypted and encapsulated.

In some embodiments of the apparatus, the DPPS information is protected against modification by and disclosure to unauthorized systems by encryption.

In some embodiments of the apparatus, the network-layer device's processing of packets using DPPS information is performed in network-layer devices that are compatible when connected in a single network with existing, deployed, legacy-type network-layer devices.

In some embodiments of the apparatus, the network-layer device's processing of packets using DPPS information does not adversely affect network scalability.

In some embodiments of the apparatus, the network-layer device's processing of packets using DPPS information is enabled in a first portion of a network in which it is beneficial, while this processing is disabled in a second portion of the network where it is not beneficial.

In some embodiments of the apparatus, the network-layer device's processing of later-arriving packets into a network-layer device using DPPS information in the later-arriving packets is changed based on the processing of the first DPPS information in the first packet.

In some embodiments of the apparatus, the network-layer device's processing of already-arrived packets in a network-layer device is changed based on the processing of the first DPPS information in the first packet.

In some embodiments of the apparatus, the network-layer device's processing of the first packet is performed in a wireless network-layer device in an ad hoc network.

In some embodiments, the present invention provides an apparatus that includes means (as described herein) for obtaining a first portion of a set of application data; means for specifying first detailed, per-packet, semantic information (DPPS information) for the first portion of the set of application data; means for associating the first DPPS information with a first packet that will transport the first portion of the set of application data; means for transmitting the first packet on the network; and means for processing the first packet in the network using the first DPPS information associated with the first packet to provide enhanced network services.

In some embodiments of the apparatus, the means for associating the first DPPS information with the first packet includes means for inserting the first DPPS information into a variable-length header of the first packet.

In some embodiments of the apparatus, the means for obtaining the first portion of the set of application data includes means for obtaining the first portion of the set of application data by application-layer software that passes the first portion of the set of application data to network-layer software; the means for specifying the first DPPS information includes means for specifying the first DPPS information by application-layer software that passes the first DPPS information to network-layer software; and the means for associating the first DPPS information with the first packet includes means for inserting the first DPPS information into a variable-length header of the first packet and inserting the first set of application data into the first packet.

Some embodiments further include means for obtaining a second portion of a set of application data; means for specifying second detailed, per-packet, semantic information (DPPS information) for the second portion of the set of application data; means for associating the second DPPS information with a second packet that will transport the second portion of the set of application data; means for transmitting the second packet on the network; and means for processing the second packet in the network using the second DPPS information associated with the second packet in a manner different than the processing of the first packet.

In some embodiments of the apparatus, the means for processing the second packet includes means for changing a queue order of the first packet within a network-layer device.

In some embodiments of the apparatus, the means for processing the second packet includes means for dropping the first packet within a network-layer device.

In some embodiments of the apparatus, the means for processing the second packet includes means for dropping the second packet within a network-layer device.

In some embodiments of the apparatus, the means for processing the second packet includes means for changing a queue order of the second packet within a network-layer device.

Some embodiments of the apparatus further include means for obtaining a second portion of a set of application data; means for associating the first DPPS information with a second packet that will transport the second portion of the set of application data; means for transmitting the second packet on the network; and means for processing the second packet in the network using the first DPPS information associated with the second packet to provide enhanced network services.

In some embodiments of the apparatus, the DPPS information includes information about a type of content in the first set of application data.

In some embodiments of the apparatus, the means for processing the first packet provides content-aware quality-of-service assurances that reflect the content of the first portion of the set of application data.

In some embodiments of the apparatus, the means for processing the first packet provides fine-grained quality-of-service assurances that support a very large number of traffic classes. In some embodiments, the very large number of traffic classes includes at least 256 classes. In some embodiments, the very large number of traffic classes includes at least 512 classes. In some embodiments, the very large number of traffic classes includes at least 1024 classes. In some embodiments, the very large number of traffic classes includes at least 2048 classes. In some embodiments, the very large number of traffic classes includes at least 4096 classes. In some embodiments, the very large number of traffic classes includes at least 8192 classes. In some embodiments, the very large number of traffic classes includes at least 16384 classes. In some embodiments, the very large number of traffic classes includes at least 32768 classes. In some embodiments, the very large number of traffic classes includes at least 65536 classes.

In some embodiments of the apparatus, the means for processing packets provides fine-grained quality-of-service assurances in which each of a plurality of packets receives a different level of service.

In some embodiments of the apparatus, the first DPPS information includes QoS-related information and the means for processing the first packet provides multi-dimensional QoS assurances based on a plurality of DPPS information attributes.

In some embodiments of the apparatus, the means for processing packets provides rate-adaptation services.

In some embodiments of the apparatus, the means for processing packets provides publish/subscribe dissemination services.

In some embodiments of the apparatus, the DPPS information includes a plurality of attributes.

In some embodiments of the apparatus, the DPPS information includes structured data.

In some embodiments of the apparatus, the DPPS information includes recursive structured data.

In some embodiments of the apparatus, the means for processing the first packet is based on the DPPS information associated with the first set of application data when the first set of application data includes an original packet that is encrypted and encapsulated.

In some embodiments of the apparatus, the DPPS information is protected against modification by and disclosure to unauthorized systems by encryption.

In some embodiments of the apparatus, the means for processing packets using DPPS information operates in network-layer devices that are compatible when connected in a single network with existing, deployed, legacy-type network-layer devices.

In some embodiments of the apparatus, the means for processing packets using DPPS information does not adversely affect network scalability.

In some embodiments of the apparatus, the means for processing packets using DPPS information is enabled in a first portion of a network in which it is beneficial, and is disabled in a second portion of the network where it is not beneficial.

In some embodiments of the apparatus, the means for processing processes later-arriving packets into a network-layer device using DPPS information in the later-arriving packets in a manner that is changed based on the processing of the first DPPS information in the first packet.

In some embodiments of the apparatus, the means for processing processes already-arrived packets in a network-layer device in a manner that is changed based on the processing of the first DPPS information in the first packet.

In some embodiments of the apparatus, the means for processing the first packet is performed in a wireless network-layer device in an ad hoc network.

In some embodiments, the present invention provides an apparatus that includes a first computer host system ("the first host") having application-layer software and network-layer software, wherein the application-layer software passes a first portion of a set of application data to the network-layer software and specifies, to the network-layer software, first detailed, per-packet, semantic information (DPPS information) for the first portion of the set of application data, and wherein the network-layer software associates the first DPPS information with a first packet that will transport the first portion of the set of application data; and a network-layer device operatively coupled to the first host, and operable to process the first packet using the first DPPS information associated with the first packet to provide enhanced network services.

In some embodiments, the present invention provides a method that includes obtaining a first portion of a set of application data; specifying first detailed, per-packet, semantic information (DPPS information) for the first portion of the set of application data; associating the first DPPS information with a first packet that will transport the first portion of the set of application data; transmitting the first packet on the network; and processing the first packet in the network using the first DPPS information associated with the first packet to provide enhanced network services.

In some embodiments of this method, the obtaining of the first portion of the set of application data includes obtaining the first portion of the set of application data by application-layer software that passes the first portion of the set of application data to network-layer software; the specifying of the first DPPS information includes specifying the first DPPS information by application-layer software that passes the first DPPS information to network-layer software; and the associating of the first DPPS information with the first packet includes inserting the first DPPS information into a header of the first packet and inserting the first set of application data into the first packet.

In some embodiments of this method, the first DPPS information includes information about a type of content in the first set of application data, and the processing of the first packet provides content-aware quality-of-service assurances that are based on the type of content of the first portion of the set of application data.

Some embodiments of this method further include obtaining a second portion of the set of application data; specifying second detailed, per-packet, semantic information (DPPS information) for the second portion of the set of application data, wherein the second DPPS information is different from the first DPPS information; associating the second DPPS information with a second packet that will transport the second portion of the set of application data; transmitting the second packet on the network; and processing the second packet in the network using the second DPPS information associated with the second packet in a manner different than the processing of the first packet. In some such embodiments, the processing of the second packet includes changing a queue order of the first packet within a network-layer device based at least in part on the second DPPS information. In some such embodiments, the processing of the second packet includes dropping the first packet within a network-layer device based at least in part on the second DPPS information.

In some embodiments of this method, the first DPPS information includes QoS-related information and the processing of the first packet provides multi-dimensional QoS assurances based on a plurality of DPPS information attributes that include at least a priority attribute, a geographic attribute, a level-within-a-hierarchical-encoding attribute and a publish-subscribe attribute.

In some embodiments of this method, the processing of packets provides publish/subscribe dissemination services.

In some embodiments, the DPPS information includes recursive structured data.

In some embodiments, the DPPS information in the header of the first packet is protected by encryption.

In some embodiments, the processing of the first packet is based on the DPPS information contained in the header of the first packet, and the application data of the first packet contains an encrypted second packet, and the DPPS information of the first packet is unencrypted DPPS information of the second packet.

In some embodiments, the processing of packets using DPPS information is enabled in a first portion of a network in which it is beneficial, while this processing is disabled in a second portion of the network in which it is not beneficial, processing of later-arriving packets into a network-layer device using DPPS information in the later-arriving packets is changed based on the processing of the first DPPS information in the first packet, and processing of already-arrived packets in a network-layer device is changed based on the processing of the first DPPS information in the first packet.

In some embodiments, the present invention provides an apparatus that includes a first computer host system having application-layer software and network-layer software, wherein the application-layer software passes a first portion of a set of application data to the network-layer software and specifies, to the network-layer software, first detailed, per-packet, semantic information (DPPS information) for the first portion of the set of application data, and wherein the network-layer software associates the first DPPS information with a first packet that will transport the first portion of the set of application data; and a network-layer device (e.g., a router) operatively coupled to the first host, and operable to process the first packet using the first DPPS information associated with the first packet to provide enhanced network services.

In some embodiments of this apparatus, the first host's network-layer software inserts the first DPPS information into a variable-length header of the first packet and inserts the first set of application data into the first packet.

In some embodiments of this apparatus, the application-layer software passes a second portion of the set of application data to the network-layer software and specifies, to the network-layer software, second detailed, per-packet, semantic information (DPPS information) for the second portion of the set of application data, the network-layer software associates the second DPPS information with a second packet that will transport the second portion of the set of application data; and the network-layer device is operable to process the second packet using the second DPPS information associated with the second packet differently than it processed the first packet.

In some embodiments of this apparatus, the first DPPS information includes QoS-related information and the network-layer device's processing of the first packet provides multi-dimensional QoS assurances based on a plurality of DPPS information attributes.

In some embodiments, the present invention provides an apparatus that includes means for obtaining a first portion of a set of application data; means for specifying first detailed, per-packet, semantic information (DPPS information) for the first portion of the set of application data; means for associating the first DPPS information with a first packet that will transport the first portion of the set of application data; means for transmitting the first packet on the network; and means for processing the first packet in the network using the first DPPS information associated with the first packet to provide enhanced network services.

In some embodiments of this apparatus, the means for associating the first DPPS information with the first packet includes means for inserting the first DPPS information into a variable-length header of the first packet, the means for obtaining the first portion of the set of application data includes means for obtaining the first portion of the set of application data by application-layer software that passes the first portion of the set of application data to network-layer software, the means for specifying the first DPPS information includes means for specifying the first DPPS information by application-layer software that passes the first DPPS information to network-layer software, and the means for associating the first DPPS information with the first packet includes means for inserting the first DPPS information into a variable-length header of the first packet and inserting the first set of application data into the first packet. This apparatus also includes means for obtaining a second portion of a set of application data; means for specifying second detailed, per-packet, semantic information (DPPS information) for the second portion of the set of application data; means for associating the second DPPS information with a second packet that will transport the second portion of the set of application data; means for transmitting the second packet on the network; and means for processing the second packet in the network using the second DPPS information associated with the second packet in a manner different than the processing of the first packet, wherein the means for processing the second packet includes means for changing a queue order of the first packet within a network-layer device, wherein the means for processing the second packet includes means for dropping the first packet within a network-layer device, wherein the means for processing the second packet includes means for dropping the second packet within a network-layer device, and wherein the means for processing the second packet includes means for changing a queue order of the second packet within a network-layer device, wherein the first DPPS information includes information about a type of content in the first set of application data, wherein the means for processing the first packet provides content-aware quality-of-service assurances that reflect the content of the first portion of the set of application data, wherein the means for processing packets provides fine-grained quality-of-service assurances in which each of a plurality of packets receives a different level of service, wherein the first DPPS information includes QoS-related information and the means for processing the first packet provides multi-dimensional QoS assurances based on a plurality of DPPS information attributes, wherein the means for processing packets provides rate-adaptation services, wherein the means for processing packets provides publish/subscribe dissemination services, wherein the first DPPS information includes a plurality of attributes, wherein the DPPS information includes recursive structured data, wherein the means for processing the first packet is based on the DPPS information associated with the first set of application data when the first set of application data includes an original packet that is encrypted and encapsulated and wherein the DPPS information is protected by encryption, wherein the means for processing packets using DPPS information is enabled in a first portion of a network in which it is beneficial, while this processing is disabled in a second portion of the network in which it is not beneficial, wherein means for processing processes later-arriving packets into a network-layer device using DPPS information in the later-arriving packets in a manner that is changed based on the processing of the first DPPS information in the first packet, wherein means for processing processes already-arrived packets in a network-layer device in a manner that is changed based on the processing of the first DPPS information in the first packet, and wherein the means for processing the first packet is performed in a wireless network-layer device in an ad hoc network.

In some embodiments, the present invention provides an apparatus that includes a network-layer device (e.g., a router) operatively coupled to receive a plurality of packets from one or more external network devices, wherein each one of the plurality of packets contains application data, wherein the plurality of packets includes a first packet that specifies a first detailed, per-packet, semantic information (first DPPS information) and application data, and a second packet that specifies a second detailed, per-packet, semantic information (second DPPS information) and application data, and wherein the network-layer device includes one or more links, one or more transmit queues and network-layer-device software operable to process the first packet using the first DPPS information to provide enhanced network services, wherein the enhanced network services include, based at least in part on the first DPPS information, selecting one of the one or more links on which the first packet will be transmitted and selecting one of the one or more transmit queues into which the first packet will be placed, wherein the network-layer-device software is also operable to process the second packet using the second DPPS information to provide enhanced network services, that include, based at least in part on the second DPPS information, selectively discarding the second packet, selecting a link on which the second packet will be transmitted, and selecting a transmit queue into which the second packet is placed, wherein the enhanced network services include selectively discarding the first packet based at least in part on the second DPPS information, and wherein the enhanced network services include, based at least in part on the second DPPS information, selectively preserving a first-in first-out order of the transmission of the first packet and the second packet relative to an order in which they were received or selectively reordering the transmission of the first packet and the second packet relative to the order in which they were received by the network.

In some embodiments, the first DPPS information is located in a variable-length header of the first packet.

In some embodiments, the first DPPS information contains information about the content of the application data contained in the first packet and the second DPPS information contains information about the content of the application data contained in the second packet, and the network device provides content-aware quality-of-service assurances that reflect the application data contained in the first packet and the application data contained in the second packet.

In some embodiments, the first DPPS information contains information about a priority of the application data in the first packet and the second DPPS information contains information about a priority of the application data in the second packet, and the network device provides fine-grained quality-of-service assurances that support at least 1000 different traffic classes.

In some embodiments, the application data is hierarchically encoded and a plurality of packets each includes data of only a single hierarchy level and the DPPS information of each respective packet of the plurality of packets specifies the hierarchy level of application data of that packet, and the network-layer device's processing of packets provides rate-adaptation services that discard data of a least-significant level within the hierarchically encoded application data.

In some embodiments, the DPPS information identifies the level of the hierarchy with which the application data is associated and the application that originated the data encoded the application hierarchically and segregated data associated with different levels of the hierarchy into different packets, and the network-layer device's processing of packets provides rate-adaptation services that discard the least significant packets.

In some embodiments, the present invention provides an apparatus that includes a network-layer device (e.g., a router) operatively coupled to receive a plurality of packets from one or more external network devices, wherein each one of the plurality of packets contains application data and the data's associated detailed, per-packet, semantic information (DPPS information), wherein the plurality of packets includes a first packet that specifies first DPPS information and associated application data, and a second packet that specifies second DPPS information and associated application data, and wherein the network-layer device includes a plurality of links, a plurality of transmit queues and network-layer-device software operable to process the first packet using the first DPPS information to provide network services that include, based at least in part on the first DPPS information, selecting one of the plurality of links on which the first packet will be transmitted and selecting one of the plurality of transmit queues into which the first packet will be placed, wherein the network-layer-device software is also operable to process the second packet using the second DPPS information to provide network services that include, based at least in part on the second DPPS information, selecting one of the plurality of links on which the second packet will be transmitted, and selecting one of the plurality of transmit queues into which the second packet is placed, and selectively discarding the second packet or the first packet, and wherein the network services include, based at least in part on the second DPPS information, selectively reordering the transmission of the first packet and the second packet relative to the order in which they were received by the network.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical, ordinal or temporal requirements on their objects.

What is claimed is:

1. A computer-implemented method comprising:
   obtaining a set of application data in a computer connected to a network;
   hierarchically encoding, in the computer, the set of application data into a plurality of portions including a first portion having a first hierarchy level and a second portion having a different second hierarchy level;
   segregating, in the computer, the set of application data such that the first portion is placed in a first plurality of packets and the second portion is placed in a different second plurality of packets;
   specifying, in the computer, first detailed, per-packet, semantic information (DPPS information) that indicates the first hierarchy level, and associating the first DPPS information with each of the first plurality of packets that will transport the first portion of the set of application data;
   specifying, in the computer, second DPPS information that indicates the second hierarchy level, and associating the second DPPS information with each one of the second plurality of packets that will transport the second portion of the set of application data;
   transmitting, from the computer, the first plurality of packets and the second plurality of packets on the network;
   processing the first plurality of packets in the network using the first DPPS information associated with the first plurality of packets, wherein the processing of the first plurality of packets in the network includes selecting one or more of a plurality of links on which the first plurality of packets will be transmitted and selecting one or more of a plurality of transmit queues into which the first plurality of packets will be placed based on the first DPPS information; and
   processing the second plurality of packets using the second DPPS information, wherein the processing of the second plurality of packets in the network includes, based on the second DPPS information either (a) selectively discarding the second plurality of packets or (b) selecting one or more of the plurality of links on which the second plurality of packets will be transmitted and selecting one or more of the plurality of transmit queues into which the second plurality of packets is placed.

2. The method of claim 1, further comprising:
   encrypting, in the computer, the application data in each of the first plurality of packets and in each of the second plurality of packets, wherein the processing of the first plurality of packets in the network is performed without decrypting the application data in the first plurality of packets.

3. The method of claim 1, further comprising:
   encrypting and encapsulating, in the computer, the application data in each of the first plurality of packets and in each of the second plurality of packets, wherein the processing of the first plurality of packets in the network is performed without decrypting the application data in the first plurality of packets.

4. The method of claim 1, wherein the first DPPS information includes subscription information, and wherein the method further includes forwarding a particular packet on a particular link of the plurality of links only if the DPPS information in the packet being processed indicates data that have been subscribed to by one or more recipients reachable through that link.

5. The method of claim 1, further comprising:
   encrypting and encapsulating, in the computer, the application data in each of the first plurality of packets to form a first plurality of encapsulated packets, wherein the processing of the first plurality of encapsulated packets in the network is performed without decrypting the application data in the first plurality of packets; and
   copying the DPPS information for each respective one of the first plurality of encapsulated packets into a header of the respective encapsulating packet.

6. The method of claim 1, further comprising:
   encrypting and encapsulating, in the computer, the application data and the DPPS information of each of the first plurality of packets to form a first plurality of protected encapsulated packets, wherein the processing of the first plurality of protected encapsulated packets in the network is performed without decrypting the encrypted application data in the first plurality of packets; and
   copying the DPPS information for each respective one of the first plurality of protected encapsulated packets into a header of the respective protected encapsulating packet.

7. The method of claim 1, wherein the first plurality of packets are part of a multicast flow.

8. An apparatus comprising:
a network-layer device connected to a network, wherein the network-layer device is operatively coupled to receive a first plurality of packets and a second plurality of packets,
wherein each one of the first plurality of packets contains part of a first portion of application data that is hierarchically encoded at a first hierarchy level,
wherein each one of the second plurality of packets contains part of a second portion of the application data that is hierarchically encoded at a second hierarchy level,
wherein each one of the first plurality of packets a first detailed, per-packet, semantic information (first DPPS information) that specifies the first hierarchy level, and each one of the second plurality of packets specifies a second detailed, per-packet, semantic information (second DPPS information) that specifies the second hierarchy level, and
wherein the network-layer device includes:
a plurality of links,
a plurality of transmit queues and
network-layer-device software operable to process the first plurality of packets using the first DPPS information to select one or more of the plurality of links on which the first plurality of packets will be transmitted and to select one or more of the plurality of transmit queues into which the first plurality of packets will be placed, and
wherein the network-layer-device software is also operable to process the second plurality of packets using the second DPPS information to selectively discard the second plurality of packets, to select one or more of the plurality of links on which the second plurality of packets will be transmitted, and to select one or more of the plurality of transmit queues into which the second plurality of packets is placed.

9. The apparatus of claim 8, further comprising;
a computer connected to the network; and
an encryptor in the computer that encrypts the application data in each of the first plurality of packets and in each of the second plurality of packets, wherein the network-layer device processes the first plurality of packets without decrypting the application data in the first plurality of packets.

10. The apparatus of claim 8, further comprising;
a computer connected to the network; and
an encryptor-encapsulator in the computer that encrypts and encapsulates the application data in each of the first plurality of packets and in each of the second plurality of packets, wherein the network-layer device processes the first plurality of packets in the network without decrypting the application data in the first plurality of packets.

11. The apparatus of claim 8, wherein the first DPPS information includes subscription information, and wherein the network-layer devices forward a packet on a particular link of the plurality of links only if the DPPS information in the packet being processed indicates data that have been subscribed to by one or more recipients reachable through that link.

12. The apparatus of claim 8, further comprising;
a computer connected to the network; and
an encryptor-encapsulator in the computer that encrypts and encapsulates the application data in each of the first plurality of packets to form a first plurality of encapsulated packets, wherein the network-layer device processes the first plurality of encapsulated packets in the network without decrypting the application data in the first plurality of packets, and wherein the encryptor-encapsulator copies the DPPS information for each respective one of the first plurality of encapsulated packets into a header of the respective encapsulated packet.

13. The apparatus of claim 8, further comprising;
a computer connected to the network; and
an encryptor-encapsulator in the computer that encrypts and encapsulates the application data and the DPPS information of each of the first plurality of packets to form a first plurality of protected encapsulated packets, wherein the network-layer device processes the first plurality of protected encapsulated packets without decrypting the encrypted application data and DPPS information in the first plurality of packets; and
copying the DPPS information for each respective one of the first plurality of protected encapsulated packets into a header of the respective protected encapsulated packet.

14. The apparatus of claim 8, wherein the first plurality of packets are part of a multicast flow.

15. An apparatus comprising:
a computer connected to a network;
means for obtaining a set of application data in the computer;
means for hierarchically encoding, in the computer, the set of application data into a plurality of portions including a first portion having a first hierarchy level and a second portion having a different second hierarchy level;
means for segregating, in the computer, the set of application data such that the first portion is placed in a first plurality of packets and the second portion is placed in a different second plurality of packets;
means for specifying, in the computer, first detailed, per-packet, semantic information (DPPS information) that indicates the first hierarchy level, and associating the first DPPS information with each of the first plurality of packets that will transport the first portion of the set of application data;
means for specifying, in the computer, second DPPS information that indicates the second hierarchy level, and associating the second DPPS information with each one of the second plurality of packets that will transport the second portion of the set of application data;
means for transmitting, from the computer, the first plurality of packets and the second plurality of packets on the network;
means for processing the first plurality of packets in the network using the first DPPS information associated with the first plurality of packets, wherein the processing of the first plurality of packets in the network includes selecting one or more of a plurality of links on which the first plurality of packets will be transmitted and selecting one or more of a plurality of transmit queues into which the first plurality of packets will be placed based on the first DPPS information; and
means for processing the second plurality of packets using the second DPPS information, wherein the processing of the second plurality of packets in the network includes, based on the second DPPS information either (a) selectively discarding the second plurality of packets or (b) selecting one or more of the plurality of links on which the second plurality of packets will be transmitted and selecting one or more of the plurality of transmit queues into which the second plurality of packets is placed.

16. The apparatus of claim 15, further comprising:
means for encrypting, in the computer, the application data in each of the first plurality of packets and in each of the second plurality of packets, wherein the processing of the first plurality of packets in the network is performed without decrypting the application data in the first plurality of packets.

17. The apparatus of claim 15, further comprising:
means for encrypting and encapsulating, in the computer, the application data in each of the first plurality of packets and in each of the second plurality of packets, wherein the processing of the first plurality of packets in the network is performed without decrypting the application data in the first plurality of packets.

18. The apparatus of claim 15, wherein the first DPPS information includes subscription information, and wherein the apparatus further includes means for forwarding a particular packet on a particular link of the plurality of links only if the DPPS information in the packet being processed indicates data that have been subscribed to by one or more recipients reachable through that link.

19. The apparatus of claim 15, further comprising:
means for encrypting and encapsulating, in the computer, the application data and the DPPS information of each of the first plurality of packets to form a first plurality of protected encapsulated packets, wherein the means for processing of the first plurality of protected encapsulated packets in the network performs without decrypting the encrypted application data in the first plurality of packets; and
means for copying the DPPS information for each respective one of the first plurality of protected encapsulated packets into a header of the respective protected encapsulating packet.

20. The apparatus of claim 15, wherein the first plurality of packets are part of a multicast flow.

* * * * *